US012725158B2

(12) United States Patent
Cao et al.

(10) Patent No.: US 12,725,158 B2
(45) Date of Patent: Sep. 1, 2026

(54) COMPUTER-IMPLEMENTED METHOD, SYSTEM, AND COMPUTER PROGRAM PRODUCT FOR DETECTING COLLUSIVE TRANSACTION FRAUD

(71) Applicant: Visa International Service Association, San Francisco, CA (US)

(72) Inventors: Shi Cao, Austin, TX (US); Chiranjeet Chetia, Round Rock, TX (US); Liang Wang, San Jose, CA (US); Junpeng Wang, San Jose, CA (US); Morvarid Jamalian, Saratoga, CA (US)

(73) Assignee: Visa International Service Association, San Francisco, CA (US)

( * ) Notice: Subject to any disclaimer, the term of this patent is extended or adjusted under 35 U.S.C. 154(b) by 519 days.

(21) Appl. No.: 17/358,575

(22) Filed: Jun. 25, 2021

(65) Prior Publication Data

US 2022/0414662 A1 Dec. 29, 2022

(51) Int. Cl.

| | |
|---|---|
| ***G06Q 20/40*** | (2012.01) |
| ***G06N 20/00*** | (2019.01) |
| ***G06Q 30/0204*** | (2023.01) |

(52) U.S. Cl.
CPC ......... *G06Q 20/4016* (2013.01); *G06N 20/00* (2019.01); *G06Q 30/0205* (2013.01)

(58) Field of Classification Search
None
See application file for complete search history.

(56) References Cited

U.S. PATENT DOCUMENTS

| | | | |
|---|---|---|---|
| 7,376,618 B1 | 5/2008 | Anderson et al. | |
| 9,721,253 B2 * | 8/2017 | Gideoni | G06Q 30/06 |
| 9,798,876 B1 | 10/2017 | Parker-Wood et al. | |
| 10,467,631 B2 * | 11/2019 | Dhurandhar | G06N 7/01 |
| 11,935,060 B1 * | 3/2024 | Gibson | G06Q 20/4016 |
| 2011/0225076 A1 | 9/2011 | Wang et al. | |
| 2013/0232045 A1 | 9/2013 | Tai et al. | |

(Continued)

FOREIGN PATENT DOCUMENTS

CN 117716377 A * 3/2024 ........... G06Q 20/363

OTHER PUBLICATIONS

Cao et al., "TitAnt: Online Real-time Transaction Fraud Detection in Ant Financial" (http://www.vldb.org/pvldb/vol12/p2082-cao.pdf).

(Continued)

*Primary Examiner* — Christopher Bridges
(74) *Attorney, Agent, or Firm* — The Webb Law Firm

(57) ABSTRACT

A method for detecting collusive transaction fraud includes: generating a merchant baseline including a transaction data baseline and a time series baseline; extracting time series data of the first merchant system; generating a first score and second score with a deep learning model; generating a first merchant risk score of the first merchant system based on the first and second scores; in response to determining that the first merchant risk score satisfies the threshold, determining a plurality of related entities related to the first merchant system; and classifying the first merchant system and at least one related entity of the plurality of related entities in a first group risk class based on at least one risk score of the at least one related entity.

14 Claims, 8 Drawing Sheets

(56) References Cited

U.S. PATENT DOCUMENTS

| | | | | |
|---|---|---|---|---|
| 2015/0170147 | A1* | 6/2015 | Geckle | G06Q 40/02 705/44 |
| 2016/0260102 | A1 | 9/2016 | Nightengale et al. | |
| 2016/0364794 | A1 | 12/2016 | Chari et al. | |
| 2018/0158062 | A1 | 6/2018 | Kohli | |
| 2018/0158063 | A1* | 6/2018 | Jamtgaard | G06Q 10/06398 |
| 2018/0218369 | A1 | 8/2018 | Xiao et al. | |
| 2019/0122258 | A1* | 4/2019 | Bramberger | G06N 3/0442 |
| 2019/0130407 | A1 | 5/2019 | Adjaoute | |
| 2019/0236608 | A1 | 8/2019 | Formsma et al. | |
| 2021/0019762 | A1 | 1/2021 | Bosnjakovic et al. | |
| 2021/0065245 | A1 | 3/2021 | Resheff et al. | |
| 2021/0248448 | A1* | 8/2021 | Branco | G06N 3/044 |
| 2021/0256485 | A1* | 8/2021 | Fidanza | G06Q 20/02 |
| 2021/0304207 | A1* | 9/2021 | Lo Faro | G06Q 40/02 |

OTHER PUBLICATIONS

Wu et al., "Developing an Unsupervised Real-time Anomaly Detection Scheme for Time Series with Multi-seasonality" (https://arxiv.org/pdf/1908.01146.pdf).

Rosvall et al. "Maps of random walks on complex networks reveal community structure", Proceedings of the National Academy of Sciences in the United States of America, 2008, pp. 1118-1123, vol. 105, No. 4.

* cited by examiner

Restaurant (MCC=5812)
Friday 12:00PM
Friday 6:00PM
Saturday 1:00PM
Saturday 6:00PM
Gas Station (MCC=5541)
Saturday 5:00PM
Sunday 3:00PM
ATM cash (MCC=6011)
Friday 10:00PM
Saturday 9:00PM
Medical Service (MCC=8099)
Saturday 10:00AM
Sunday 10:00AM
Transaction Count
Time

COMPUTER-IMPLEMENTED METHOD, SYSTEM, AND COMPUTER PROGRAM PRODUCT FOR DETECTING COLLUSIVE TRANSACTION FRAUD

BACKGROUND

1. Technical Field

This disclosure relates generally to fraud detection and, in particular embodiments, to a computer-implemented method, system, and computer program product for detecting collusive transaction fraud (e.g., money laundering, interchange abuse, behavioral changes and conducting regional and/or global illicit transaction activity).

2. Technical Considerations

Existing methods and systems for detecting transaction fraud have focused on identifying a single specific entity that is the source of the fraud. However, not all transaction fraud is perpetrated by a single actor, and collusive transaction fraud involves multiple entities acting in concert to complete fraudulent transactions. Example types of collusive transaction fraud can include money laundering, interchange abuse, behavioral changes, and conducting regional and/or global illicit transaction activity. The existing detection methods and systems are not equipped to detect collusive transaction fraud.

SUMMARY

According to some non-limiting embodiments or aspects, a computer-implemented method for detecting collusive transaction fraud includes: generating, with at least one processor, a merchant baseline based on a merchant category code associated with a first merchant system operating in an electronic payment processing network, the merchant baseline including: (i) a transaction data baseline including transaction data baseline data associated with the merchant category code; and (ii) a time series baseline including time series baseline data associated with the merchant category code; extracting, with the at least one processor, time series data associated with the first merchant system; generating, with the at least one processor, a first score based on comparing transaction data associated with the first merchant system to the transaction data baseline with a deep learning model; generating, with the at least one processor, a second score based on comparing the time series data associated with the first merchant system to the time series baseline with the deep learning model; generating, with the at least one processor, a first merchant risk score associated with the first merchant system based on the first score and the second score; determining, with the at least one processor, that the first merchant risk score satisfies a threshold; in response to determining that the first merchant risk score satisfies the threshold, determining, with the at least one processor, a plurality of related entities related to the first merchant system; and classifying, with the at least one processor, the first merchant system and at least one related entity of the plurality of related entities in a first group risk class based on at least one risk score associated with the at least one related entity.

In some non-limiting embodiments or aspects, the plurality of related entities may include at least one of the following: an acquirer system associated with the first merchant system, a second merchant system associated with the acquirer system associated with the first merchant system, and a payment device which initiated a payment transaction with the first merchant system. The computer-implemented method may further include: in response to classifying the first merchant system and the at least one related entity of the plurality of related entities in the first group risk class, placing, with the at least one processor, a hold on transaction activity conducted by at least one of the first merchant system and the at least one related entity of the plurality of related entities. The computer-implemented method may further include: in response to classifying the first merchant system and the at least one related entity of the plurality of related entities in the first group risk class, automatically initiating, with the at least one processor, an investigation protocol. The computer-implemented method may further include: determining, with the at least one processor, that the merchant category code associated with the first merchant system is miscoded; determining, with the at least one processor, a corrected merchant category code associated with the first merchant system; and modifying, with the at least one processor, the merchant category code associated with the first merchant system to the corrected merchant category code. The computer-implemented method may further include: determining, with the at least one processor, a region code associated with the first merchant system; and detecting illicit transaction activity of the first merchant system based on the corrected merchant category code and the region code. The computer-implemented method may further include: identifying, with the at least one processor, at least one payment transaction conducted between the first merchant system and the at least one related entity of the plurality of related entities in the first group risk class; determining, with the at least one processor, that the at least one payment transaction is a cross-border payment transaction associated with a first region and a second region; generating, with at least one processor, a transaction risk score associated with the at least one payment transaction based on at least one of the following: a status of the at least one payment transaction as a cross-border payment transaction, the first region, the second region, and the merchant category code; determining, with the at least one processor, that the transaction risk score satisfies a threshold; and classifying, with the at least one processor, the at least one payment transaction in a first transaction risk class in response to determining that the transaction risk score satisfies the threshold.

According to some non-limiting embodiments or aspects, a system for detecting collusive transaction fraud includes at least one processor programmed or configured to: generate a merchant baseline based on a merchant category code associated with a first merchant system operating in an electronic payment processing network, the merchant baseline including: (i) a transaction data baseline including transaction data baseline data associated with the merchant category code; and (ii) a time series baseline including time series baseline data associated with the merchant category code; extract time series data associated with the first merchant system; generate a first score based on comparing transaction data associated with the first merchant system to the transaction data baseline with a deep learning model; generate a second score based on comparing the time series data associated with the first merchant system to the time series baseline with the deep learning model; generate a first merchant risk score associated with the first merchant system based on the first score and the second score; determine that the first merchant risk score satisfies a threshold; in response to determining that the first merchant risk score satisfies the threshold, determine a plurality of related entities related to the first merchant system; and classify the first merchant system and at least one related entity of the plurality of related entities in a first group risk class based on at least one risk score associated with the at least one related entity.

In some non-limiting embodiments or aspects, the plurality of related entities may include at least one of the following: an acquirer system associated with the first merchant system, a second merchant system associated with the acquirer system associated with the first merchant system, and a payment device which initiated a payment transaction with the first merchant system. The at least one processor may be further programmed or configured to: in response to classifying the first merchant system and the at least one related entity of the plurality of related entities in the first group risk class, place a hold on transaction activity conducted by at least one of the first merchant system and the at least one related entity of the plurality of related entities. The at least one processor may be further programmed or configured to: in response to classifying the first merchant system and the at least one related entity of the plurality of related entities in the first group risk class, automatically initiate an investigation protocol. The at least one processor may be further programmed or configured to: determine that the merchant category code associated with the first merchant system is miscoded; determine a corrected merchant category code associated with the first merchant system; and modify the merchant category code associated with the first merchant system to the corrected merchant category code. The at least one processor may be further programmed or configured to: determine a region code associated with the first merchant system; and detect illicit transaction activity of the first merchant system based on the corrected merchant category code and the region code. The at least one processor may be further programmed or configured to: identify at least one payment transaction conducted between the first merchant system and the at least one related entity of the plurality of related entities in the first group risk class; determine that the at least one payment transaction is a cross-border payment transaction associated with a first region and a second region; generate a transaction risk score associated with the at least one payment transaction based on at least one of the following: a status of the at least one payment transaction as a cross-border payment transaction, the first region, the second region, and the merchant category code; determine that the transaction risk score satisfies a threshold; and classify the at least one payment transaction in a first transaction risk class in response to determining that the transaction risk score satisfies the threshold.

According to some non-limiting embodiments or aspects, a computer program product for detecting collusive transaction fraud includes at least one non-transitory computer-readable medium including one or more instructions that, when executed by at least one processor, cause the at least one processor to: generate a merchant baseline based on a merchant category code associated with a first merchant system operating in an electronic payment processing network, the merchant baseline including: (i) a transaction data baseline including transaction data baseline data associated with the merchant category code; and (ii) a time series baseline including time series baseline data associated with the merchant category code; extract time series data associated with the first merchant system; generate a first score based on comparing transaction data associated with the first merchant system to the transaction data baseline with a deep learning model; generate a second score based on comparing the time series data associated with the first merchant system to the time series baseline with the deep learning model; generate a first merchant risk score associated with the first merchant system based on the first score and the second score; determine that the first merchant risk score satisfies a threshold; in response to determining that the first merchant risk score satisfies the threshold, determine a plurality of related entities related to the first merchant system; and classify the first merchant system and at least one related entity of the plurality of related entities in a first group risk class based on at least one risk score associated with the at least one related entity.

In some non-limiting embodiments or aspects, the plurality of related entities may include at least one of the following: an acquirer system associated with the first merchant system, a second merchant system associated with the acquirer system associated with the first merchant system, and a payment device which initiated a payment transaction with the first merchant system. The one or more instructions may further cause the at least one processor to: in response to classifying the first merchant system and the at least one related entity of the plurality of related entities in the first group risk class, place a hold on transaction activity conducted by at least one of the first merchant system and the at least one related entity of the plurality of related entities. The one or more instructions may further cause the at least one processor to: in response to classifying the first merchant system and the at least one related entity of the plurality of related entities in the first group risk class, automatically initiate an investigation protocol. The one or more instructions may further cause the at least one processor to: determine that the merchant category code associated with the first merchant system is miscoded; determine a corrected merchant category code associated with the first merchant system; and modify the merchant category code associated with the first merchant system to the corrected merchant category code. The one or more instructions may further cause the at least one processor to: determine a region code associated with the first merchant system; and detect illicit transaction activity of the first merchant system based on the corrected merchant category code and the region code. The one or more instructions may further cause the at least one processor to: identify at least one payment transaction conducted between the first merchant system and the at least one related entity of the plurality of related entities in the first group risk class; determine that the at least one payment transaction is a cross-border payment transaction associated with a first region and a second region; generate a transaction risk score associated with the at least one payment transaction based on at least one of the following: a status of the at least one payment transaction as a cross-border payment transaction, the first region, the second region, and the merchant category code; determine that the transaction risk score satisfies a threshold; and classify the at least one payment transaction in a first transaction risk class in response to determining that the transaction risk score satisfies the threshold.

Further non-limiting embodiments or aspects are set forth in the following numbered clauses:

Clause 1: A computer-implemented method for detecting collusive transaction fraud, comprising: generating, with at least one processor, a merchant baseline based on a merchant category code associated with a first merchant system operating in an electronic payment processing network, the merchant baseline comprising: (i) a transaction data baseline comprising transaction data baseline data associated with the merchant category code; and (ii) a time series baseline comprising time series baseline data associated with the merchant category code; extracting, with the at least one processor, time series data associated with the first merchant system; generating, with the at least one processor, a first score based on comparing transaction data associated with the first merchant system to the transaction data baseline with a deep learning model; generating, with the at least one processor, a second score based on comparing the time series data associated with the first merchant system to the time series baseline with the deep learning model; generating, with the at least one processor, a first merchant risk score associated with the first merchant system based on the first score and the second score; determining, with the at least one processor, that the first merchant risk score satisfies a threshold; in response to determining that the first merchant risk score satisfies the threshold, determining, with the at least one processor, a plurality of related entities related to the first merchant system; and classifying, with the at least one processor, the first merchant system and at least one related entity of the plurality of related entities in a first group risk class based on at least one risk score associated with the at least one related entity.

Clause 2: The computer-implemented method of clause 1, wherein the plurality of related entities comprise at least one of the following: an acquirer system associated with the first merchant system, a second merchant system associated with the acquirer system associated with the first merchant system, and a payment device which initiated a payment transaction with the first merchant system.

Clause 3: The computer-implemented method of clause 1 or 2, further comprising: in response to classifying the first merchant system and the at least one related entity of the plurality of related entities in the first group risk class, placing, with the at least one processor, a hold on transaction activity conducted by at least one of the first merchant system and the at least one related entity of the plurality of related entities.

Clause 4: The computer-implemented method of any of clauses 1 to 3, further comprising: in response to classifying the first merchant system and the at least one related entity of the plurality of related entities in the first group risk class, automatically initiating, with the at least one processor, an investigation protocol.

Clause 5: The computer-implemented method of any of clauses 1 to 4, further comprising: determining, with the at least one processor, that the merchant category code associated with the first merchant system is miscoded; determining, with the at least one processor, a corrected merchant category code associated with the first merchant system; and modifying, with the at least one processor, the merchant category code associated with the first merchant system to the corrected merchant category code.

Clause 6: The computer-implemented method of any of clauses 1 to 5, further comprising: determining, with the at least one processor, a region code associated with the first merchant system; and detecting illicit transaction activity of the first merchant system based on the corrected merchant category code and the region code.

Clause 7: The computer-implemented method of any of clauses 1 to 6, further comprising: identifying, with the at least one processor, at least one payment transaction conducted between the first merchant system and the at least one related entity of the plurality of related entities in the first group risk class; determining, with the at least one processor, that the at least one payment transaction is a cross-border payment transaction associated with a first region and a second region; generating, with at least one processor, a transaction risk score associated with the at least one payment transaction based on at least one of the following: a status of the at least one payment transaction as a cross-border payment transaction, the first region, the second region, and the merchant category code; determining, with the at least one processor, that the transaction risk score satisfies a threshold; and classifying, with the at least one processor, the at least one payment transaction in a first transaction risk class in response to determining that the transaction risk score satisfies the threshold.

Clause 8: A system for detecting collusive transaction fraud, comprising at least one processor programmed or configured to: generate a merchant baseline based on a merchant category code associated with a first merchant system operating in an electronic payment processing network, the merchant baseline comprising: (i) a transaction data baseline comprising transaction data baseline data associated with the merchant category code; and (ii) a time series baseline comprising time series baseline data associated with the merchant category code; extract time series data associated with the first merchant system; generate a first score based on comparing transaction data associated with the first merchant system to the transaction data baseline with a deep learning model; generate a second score based on comparing the time series data associated with the first merchant system to the time series baseline with the deep learning model; generate a first merchant risk score associated with the first merchant system based on the first score and the second score; determine that the first merchant risk score satisfies a threshold; in response to determining that the first merchant risk score satisfies the threshold, determine a plurality of related entities related to the first merchant system; and classify the first merchant system and at least one related entity of the plurality of related entities in a first group risk class based on at least one risk score associated with the at least one related entity.

Clause 9: The system of clause 8, wherein the plurality of related entities comprise at least one of the following: an acquirer system associated with the first merchant system, a second merchant system associated with the acquirer system associated with the first merchant system, and a payment device which initiated a payment transaction with the first merchant system.

Clause 10: The system of clause 8 or 9, wherein the at least one processor is further programmed or configured to: in response to classifying the first merchant system and the at least one related entity of the plurality of related entities in the first group risk class, place a hold on transaction activity conducted by at least one of the first merchant system and the at least one related entity of the plurality of related entities.

Clause 11: The system of any of clauses 8 to 10, wherein the at least one processor is further programmed or configured to: in response to classifying the first merchant system and the at least one related entity of the plurality of related entities in the first group risk class, automatically initiate an investigation protocol.

Clause 12: The system of any of clauses 8 to 11, wherein the at least one processor is further programmed or configured to: determine that the merchant category code associated with the first merchant system is miscoded; determine a corrected merchant category code associated with the first merchant system; and modify the merchant category code associated with the first merchant system to the corrected merchant category code.

Clause 13: The system of any of clauses 8 to 12, wherein the at least one processor is further programmed or configured to: determine a region code associated with the first merchant system; and detect illicit transaction activity of the first merchant system based on the corrected merchant category code and the region code.

Clause 14: The system of any of clauses 8 to 13, wherein the at least one processor is further programmed or configured to: identify at least one payment transaction conducted between the first merchant system and the at least one related entity of the plurality of related entities in the first group risk class; determine that the at least one payment transaction is a cross-border payment transaction associated with a first region and a second region; generate a transaction risk score associated with the at least one payment transaction based on at least one of the following: a status of the at least one payment transaction as a cross-border payment transaction, the first region, the second region, and the merchant category code; determine that the transaction risk score satisfies a threshold; and classify the at least one payment transaction in a first transaction risk class in response to determining that the transaction risk score satisfies the threshold.

Clause 15: A computer program product for detecting collusive transaction fraud, the computer program product comprising at least one non-transitory computer-readable medium including one or more instructions that, when executed by at least one processor, cause the at least one processor to: generate a merchant baseline based on a merchant category code associated with a first merchant system operating in an electronic payment processing network, the merchant baseline comprising: (i) a transaction data baseline comprising transaction data baseline data associated with the merchant category code; and (ii) a time series baseline comprising time series baseline data associated with the merchant category code; extract time series data associated with the first merchant system; generate a first score based on comparing transaction data associated with the first merchant system to the transaction data baseline with a deep learning model; generate a second score based on comparing the time series data associated with the first merchant system to the time series baseline with the deep learning model; generate a first merchant risk score associated with the first merchant system based on the first score and the second score; determine that the first merchant risk score satisfies a threshold; in response to determining that the first merchant risk score satisfies the threshold, determine a plurality of related entities related to the first merchant system; and classify the first merchant system and at least one related entity of the plurality of related entities in a first group risk class based on at least one risk score associated with the at least one related entity.

Clause 16: The computer program product of clause 15, wherein the plurality of related entities comprise at least one of the following: an acquirer system associated with the first merchant system, a second merchant system associated with the acquirer system associated with the first merchant system, and a payment device which initiated a payment transaction with the first merchant system.

Clause 17: The computer program product of clause 15 or 16, wherein the one or more instructions further cause the at least one processor to: in response to classifying the first merchant system and the at least one related entity of the plurality of related entities in the first group risk class, place a hold on transaction activity conducted by at least one of the first merchant system and the at least one related entity of the plurality of related entities.

Clause 18: The computer program product of any of clauses 15 to 17, wherein the one or more instructions further cause the at least one processor to: in response to classifying the first merchant system and the at least one related entity of the plurality of related entities in the first group risk class, automatically initiate an investigation protocol.

Clause 19: The computer program product of any of clauses 15 to 18, wherein the one or more instructions further cause the at least one processor to: determine that the merchant category code associated with the first merchant system is miscoded; determine a corrected merchant category code associated with the first merchant system; and modify the merchant category code associated with the first merchant system to the corrected merchant category code.

Clause 20: The computer program product of any of clauses 15 to 19, wherein the one or more instructions further cause the at least one processor to: determine a region code associated with the first merchant system; and detect illicit transaction activity of the first merchant system based on the corrected merchant category code and the region code.

Clause 21: The computer program product of any of clauses 15 to 20, wherein the one or more instructions further cause the at least one processor to: identify at least one payment transaction conducted between the first merchant system and the at least one related entity of the plurality of related entities in the first group risk class; determine that the at least one payment transaction is a cross-border payment transaction associated with a first region and a second region; generate a transaction risk score associated with the at least one payment transaction based on at least one of the following: a status of the at least one payment transaction as a cross-border payment transaction, the first region, the second region, and the merchant category code; determine that the transaction risk score satisfies a threshold; and classify the at least one payment transaction in a first transaction risk class in response to determining that the transaction risk score satisfies the threshold.

BRIEF DESCRIPTION OF THE DRAWINGS

Additional advantages and details of the disclosure are explained in greater detail below with reference to the exemplary embodiments that are illustrated in the accompanying schematic figures, in which.

DETAILED DESCRIPTION

Figure 1:
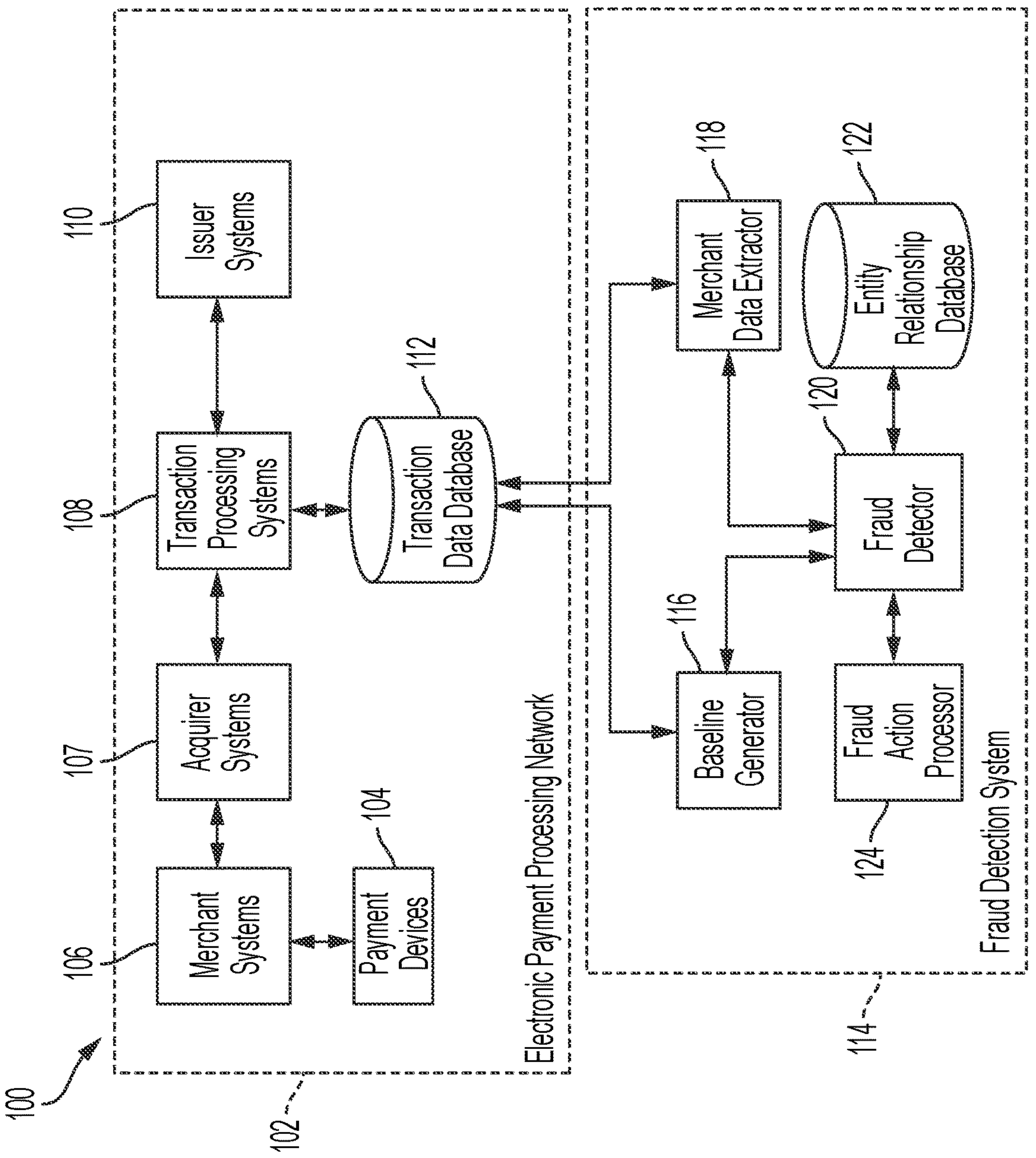
FIG. 1 shows a schematic diagram of a system for detecting collusive transaction fraud according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

The term "account data," as used herein, may refer to any data concerning one or more accounts for one or more users. Account data may include, for example, one or more account identifiers, user identifiers, transaction histories, balances, credit limits, issuer institution identifiers, and/or the like.

As used herein, the term "account identifier" may refer to one or more types of identifiers associated with an account (e.g., a primary account number (PAN) associated with an account, a card number associated with an account, a payment card number associated with an account, a token associated with an account, and/or the like). In some non-limiting embodiments, an issuer may provide an account identifier (e.g., a PAN, a token, and/or the like) to a user (e.g., an accountholder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments, the account identifier may be an original account identifier, where the original account identifier was provided to a user at the creation of the account associated with the account identifier. In some non-limiting embodiments, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments, an acquirer may be a financial institution, such as a bank.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

As used herein, the term "computing device" may refer to one or more electronic devices that are configured to process data. A computing device may be a mobile device, a desktop computer, and/or any other like device. Furthermore, the term "computer" may refer to any computing device that includes the necessary components to receive, process, and output data, and normally includes a display, a processor, a memory, an input device, and a network interface As used herein, the term "issuer" or "issuer institution" or "issuer bank" may refer to one or more entities, such as a bank, that provide accounts to customers for conducting payment transactions, such as initiating credit and/or debit payments. For example, an issuer institution may provide an account identifier, such as a PAN, to a customer that uniquely identifies one or more accounts associated with that customer. The account identifier may be embodied on a physical financial instrument, such as a payment card, and/or may be electronic and used for electronic payments. An issuer institution may be associated with a bank identification number or other unique identifier that uniquely identifies it among other issuer institutions. The terms "issuer institution," "issuer bank," and "issuer system" may also refer to one or more computer systems operated by or on behalf of an issuer institution, such as a server computer executing one or more software applications. For example, an issuer system may include one or more authorization servers for authorizing a payment transaction.

As used herein, the terms "machine learning model" and "deep learning model" may refer to a set of programmatic (e.g., software) routines and parameters configured to predict one or more outputs of a real-world process (e.g., identification of collusive transaction fraud or the like) based on a set of input features. A structure of the programmatic routines (e.g., number of subroutines and relation between them) and/or the values of the parameters can be determined in a training process, which can use actual results of the real-world process that is being modeled.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "payment device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the payment device may include volatile or non-volatile memory to store information (e.g., an account identifier, a name of the account holder, and/or the like).

The term "processor," as used herein, may represent any type of processing unit, such as a single processor having one or more cores, one or more cores of one or more processors, multiple processors each having one or more cores, and/or other arrangements and combinations of processing units.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server," "the server," "at least one processor," or "the at least one processor," or the like, as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction fraud" may refer to any type of scheme in connection with one or more transactions that uses one or more components of a public or private network to distribute software, exploit systems, publish fraudulent solicitations, conduct fraudulent transactions, transmit proceeds obtained through fraud, and/or the like. Transaction fraud may be perpetrated by a single entity. Transaction fraud may be perpetrated by multiple entities acting in concert to carry out the transaction fraud, which may be referred to as "collusive transaction fraud". Non-limiting examples of collusive transaction fraud include money laundering, interchange abuse (e.g., conducting transactions while intentionally using a miscoded merchant category code, such as for the purpose of obtaining a more favorable interchange rate), behavioral changes, and engaging in regional and/or global illicit activity (e.g., by conducting transactions while intentionally using a miscoded merchant category code for the purpose of obfuscating the fact that the transaction is associated with a type of good or service illegal in the region in which the transaction is conducted).

As used herein, the term "transaction service provider" may refer to an entity that receives transaction authorization requests from merchants or other entities and provides guarantees of payment, in some cases through an agreement between the transaction service provider and an issuer institution. The terms "transaction service provider" and "transaction processing system" may also refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

Non-limiting embodiments or aspects described herein are directed to a system, method, and computer program product for detecting collusive transaction fraud. Non-limiting embodiments or aspects enable simultaneous assessment of multiple related entities to identify entities acting in concert to perpetrate collusive transaction fraud. A merchant system may be evaluated for fraud risk using a plurality of baselines that analyze transaction data and time series data relative to the same data associated with the merchant category code of the merchant system to identify an anomaly indicative of potential fraudulent activity. Based on identifying potentially fraudulent merchant systems, related acquirers, merchants and/or payment devices may be identified. These related entities may be evaluated for anomalous activity indicative of potential fraudulent activity such that the merchant system and related entities may be identified as a collusive group(s). Non-limiting embodiments or aspects enable the system to initiate fraud action protocols to further investigate potential collusion and/or prevent future collusion from occurring. This creates a more secure and efficient transaction processing system. Non-limiting embodiments or aspects enable the system to identify the type of fraudulent activity that may be occurring such that the appropriate corrective actions can be taken.

Referring to FIG. 1, a system 100 is shown for detecting collusive transaction fraud according to some non-limiting embodiments or aspects. The system 100 may include an electronic payment processing network 102 to process electronic payment transactions between users (e.g., consumers) and merchants. The electronic payment transactions may be initiated by the user using a payment device 104. The payment device 104 may contain account data including the user's account identifier which may be provided to a merchant system 106 of the merchant of the electronic payment transaction. The merchant system 106 may generate a transaction message comprising transaction data for processing (e.g., authorizing, clearing, settling) the electronic payment transaction. The transaction data may include the account data and additional data associated with the electronic payment transaction (e.g., product/service data, merchant data, time data, location data, etc.). The transaction data may comprise data described in ISO 8583, for example.

With continued reference to FIG. 1, the merchant system 106 may communicate the transaction message to an acquirer system 107 associated with the merchant. The acquirer system 107 may communicate the transaction message to the transaction processing system 108 of the transaction service provider. The transaction service provider may be the transaction service provider associated with the user's payment device 104. The acquirer system 107 may add additional transaction data (e.g., data described in ISO 8583) to the transaction message prior to communicating the transaction message to the transaction processing system 108.

In response to receiving the transaction message, the transaction processing system 108 may generate a transaction request comprising at least a portion of the transaction data contained in the transaction message. The transaction processing system 108 may add additional transaction data (e.g., data described in ISO 8583) not contained in the transaction message to the transaction request. The transaction request may comprise a data structure consistent with ISO 8583. The transaction processing system 108 may communicate the generated transaction request to an issuer system 110 of the issuer of the user's payment device 104.

With continued reference to FIG. 1, in some non-limiting embodiments or aspects, the issuer system 110 may generate an authorization decision in response to receiving the transaction request. The authorization decision may comprise a decline authorization decision. The authorization decision may comprise an approval authorization decision. The authorization decision may comprise a partial approval authorization decision. The issuer system 110 may generate a transaction request response comprising the authorization decision and may communicate the transaction request response to the transaction processing system 108.

The transaction processing system 108 may generate and communicate a transaction message response to the acquirer system 107 which may comprise the authorization decision. The acquirer system 107 may communicate the transaction response message to the merchant system 106.

With continued reference to FIG. 1, in some non-limiting embodiments or aspects, the transaction processing system 108 may store at least a portion of the data associated with the electronic payment transaction in the transaction data database 112. This may include the account data, transaction data, and/or the authorization decision. This may include any data generated by the merchant system 106, acquirer system 107, transaction processing system 108, and/or issuer system 110, such as risk scores generated for the electronic payment transaction and/or payment device 104 and/or merchant system 106, and the like. The transaction data database 112 may also comprise post-authorization data associated with the electronic payment transaction, such as clearing and settlement data, return data, fraud data, and/or the like.

It will be appreciated that the above-described process, while described in connection with a single electronic payment transaction, may be conducted for each electronic payment transaction initiated by a payment device 104 over the electronic payment processing network 102. The merchant system 106 and acquirer system 107 for any particular electronic payment transaction being processed may be associated with the merchant engaged with the user in the electronic payment transaction. The transaction processing system 108 and issuer system 110 for any particular electronic payment transaction being processed may be associated with the payment device 104 used to initiate the electronic payment transaction. As such, the transaction data database 112 may comprise data from each electronic payment transaction processed over the electronic payment processing network 102 by the transaction processing system 108.

Further, while the merchant system 106, acquirer system 107, transaction processing system 108, and issuer system 110 are shown in FIG. 1 as separate systems, any of these systems may be combined with any other of these systems. For example, the transaction processing system 108 and the issuer system 110 may be part of the same system or may be separate systems as shown. For example, the merchant system 106 and the acquirer system 107 may be part of the same system or may be separate systems as shown.

With continued reference to FIG. 1, in some non-limiting embodiments or aspects, the system 100 may include a fraud detection system 114. The fraud detection system 114 may comprise a baseline generator 116 and a merchant data extractor 118 in communication with the transaction data database 112. The fraud detection system 114 may comprise a fraud detector 120 in communication with the baseline generator 116 and/or the merchant data extractor 118. The baseline generator 116, merchant data extractor 118, and fraud detector 120 may each be one or more software applications and/or software functions executed by one or more computing devices. In some examples, the baseline generator 116, merchant data extractor 118, and fraud detector 120 may be part of the same software application, different software applications, same computing device, different computing devices, and the like. The fraud detection system 114 may comprise an entity relationship database 122 in communication with the fraud detector 120. The fraud detection system 114 may comprise a fraud action processor 124 in communication with the fraud detector 120. The fraud action processor 124 and the fraud detector 120 may be part of the same software application, different software applications, same computing device, different computing devices, and the like. The fraud action processor 124 may be one or more software applications and/or software functions executed by one or more computing devices. The fraud detection system 114 is configured to detect collusive transaction fraud occurring between a plurality of entities.

Figure 2:
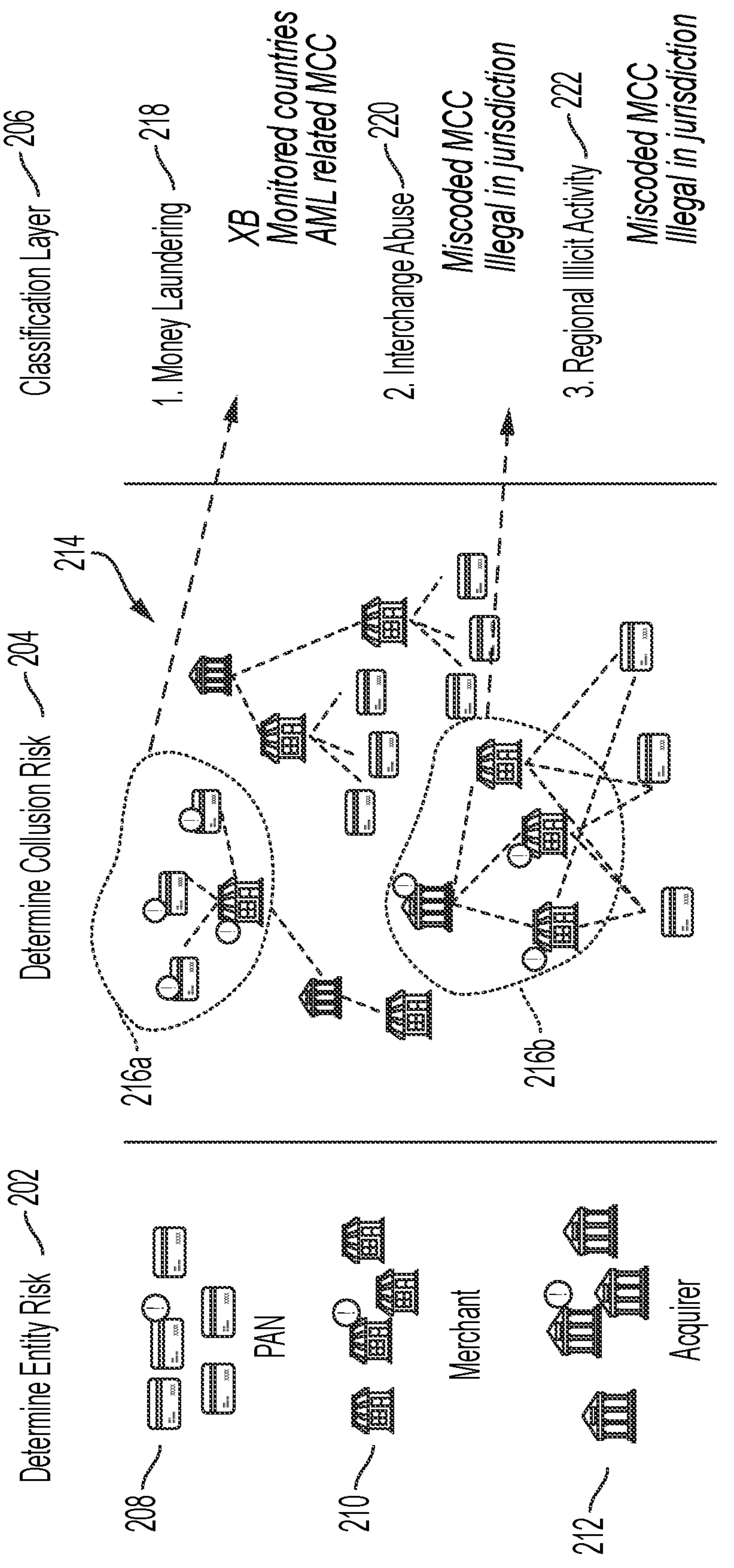
FIG. 2 shows a schematic diagram of a method and system for detecting collusive transaction fraud according to some non-limiting embodiments or aspects.

Referring to FIG. 2, a method and system are shown for detecting collusive transaction fraud according to some non-limiting embodiments or aspects. FIG. 2 also shows non-limiting examples of entities which may collude to conduct collusive transaction fraud. The steps shown in FIG. 2 are for example purposes only. Additional, fewer, and/or a different order of steps may be employed in non-limiting embodiments or aspects.

With continued reference to FIG. 2, the method for detecting collusive transaction fraud may comprise a step 202 of determining entity risk. The entities involved in collusive transaction fraud may comprise at least one of the following: a payment device 208, a merchant system 210, and an acquirer system 212. At least two of the same entity types (e.g., at least two merchant systems) may engage in collusive transaction fraud. Additionally or alternatively, at least two different entity types (e.g., a merchant system and an acquirer system) may engage in collusive transaction fraud. Any number and combination of entities may engage in collusive transaction fraud.

The method may include a step 204 of determining collusion risk. This may include determining entity networks 214 formed to conduct electronic payment transactions. The entity network 214 may indicate which acquirer systems 212, merchant systems 210, and/or payment devices 208 are related (e.g., having engaged in at least one common electronic payment transaction during a time period).

The entity network 214 may be represented as a tree data structure to represent which acquirer systems 212, merchant systems 210, and payment devices 208 have engaged in at least one electronic payment transaction during a time period. Frequency of two entities engaging in electronic payment transactions may also be shown by any means known in the art, such as by line thickness between nodes of the tree data structure in a visual representation and/or by assigned weights to the edges in a data representation.

Groups of entities and collusion risk and/or type of risk associated with each may be identified using the entity network 214. Entities identified as having anomalous activity associated therewith (indicating potential fraud) are identified in FIG. 2 with an exclamation point. Risk groups 216*a*, 216*b* comprising a plurality of entities may be identified in the entity network 214 for connected entities having anomalous activity associated therewith, and these groups may be analyzed for potential collusive transaction fraud. In the depicted example, risk group 216*a* comprises a merchant system connected with three payment devices, all entities of which have been identified as having anomalous activity associated therewith such that the risk group 216*a* may be engaging in collusive transaction fraud. For example, risk group 216*b* comprises an acquirer system connected with three merchant systems, certain entities of which have been identified as having anomalous activity associated therewith such that the risk group 216*b* may be engaging in collusive transaction fraud. It will be appreciated that different numbers, combinations, and/or levels of these entities in the entity network 214 may be identified as a risk group potentially engaging in collusive transaction fraud.

With continued reference to FIG. 2, in some non-limiting embodiments or aspects, the method for detecting collusive transaction fraud may comprise a step 206 of classifying collusive transaction fraud. Classifying collusive transaction fraud may comprise identifying the type of collusive transaction fraud being conducted by the identified risk groups 216*a*, 216*b*, if any. Non-limiting examples of types of collusive transaction fraud comprise money laundering 218, interchange abuse 220, and conducting regional and/or global illicit activity 222. A risk group may be engaging in one or more of such types of collusive transaction fraud.

Money laundering collusive transaction fraud comprises the illegal process of making it appear that amounts of money generated by criminal activity came from a legitimate source. This may be effected by passing the money through a complex sequence of transfers. Any combination of entity types may be involved in money laundering, such as a combination of a merchant system and a payment device, as shown in FIG. 2. Determining whether a risk group is engaged in money laundering may comprise considering cross-border transaction data associated with cross-border transactions engaged in by the entities. A cross-border transaction is a transaction in which the user and the merchant are based in different jurisdictional regions (e.g., different countries, different states, etc.). The regions involved in the cross-border transaction may be used as input to an algorithm because certain regions or combinations of regions may be more commonly associated with money laundering activity. Using the merchant category code (MCC) as an input may improve detection of money laundering, as certain MCCs may be more commonly associated with money laundering activity. The methods and systems described herein may detect and/or prevent money laundering.

Interchange abuse collusive transaction fraud comprises an electronic payment transaction being processed using a miscoded MCC. A miscoded MCC may be an MCC which inaccurately classifies the goods/services being exchanged in the electronic payment transaction such that a different MCC more accurately classifies the goods/services being exchanged. Interchange abuse may be conducted by a risk group to obtain a more favorable interchange rate compared to an interchange rate associated with the correct MCC. For example, the miscoded MCC may have a lower interchange rate than the correct MCC, such that it is more desirable for the merchant to conduct electronic payment transactions using the miscoded MCC to avoid the higher interchange rate. Any combination of entity types may be involved in interchange abuse, such as a combination of an acquirer system and a merchant system, as shown in FIG. 2. Determining whether a risk group is engaged in interchange abuse may comprise using, as an input, the MCC as submitted by the collusive entity (e.g., the merchant system). The methods and systems described herein may detect and/or prevent interchange abuse.

Conducting regional and/or global illicit activity collusive transaction fraud comprises an electronic payment transaction being processed using a miscoded MCC, with the correct MCC being illegal in the particular region. Regional and/or global illicit activity may be conducted by a risk group without appearing illegal since the miscoded MCC is used. For example, gambling is an illegal activity in certain regions. Therefore, a collusive entity engaging in gambling transactions in that region may miscode the MCC to a non-gambling MCC to avoid exposing the illicit activity. Any combination of entity types may be involved in conducting regional and/or global illicit activity, such as a combination of an acquirer system and a merchant system, as shown in FIG. 2. Determining whether a risk group is engaged in conducting regional and/or global illicit activity may comprise using, as an input, the MCC as submitted by the collusive entity (e.g., the merchant system). The methods and systems described herein may detect and/or prevent illicit activity.

Referring again to FIG. 1, the fraud detection system 114 detects collusive transaction fraud as described hereinafter in connection with FIG. 2.

In some non-limiting embodiments or aspects, for a first merchant system being evaluated for involvement in potential collusive transaction fraud, the baseline generator 116 may generate a merchant baseline based on an MCC associated with (e.g., submitted by) the first merchant system operating in the electronic payment processing network 102. The merchant baseline may comprise a plurality of baselines comprising: (i) a transaction data baseline comprising transaction data baseline data associated with the MCC; and (ii) a time series baseline comprising time series baseline data associated with the MCC.

To generate the transaction data baseline, the baseline generator 116 may extract (e.g., through a parsing algorithm, through an API, through a database query, and/or any other like retrieval methods) the submitted MCC of the first merchant system from the transaction data database 112. Based on the submitted MCC, the baseline generator 116 may extract the transaction baseline data associated with the submitted MCC from the transaction data database 112. For example, if the first merchant system submits its MCC for a transaction as MCC 0742 (veterinary services), the baseline generator 116 may extract transaction baseline data associated with MCC 0742 from the transaction data database 112. The transaction baseline data may comprise any data stored in the transaction data database 112 or any data that may be generated therefrom. The transaction baseline data may comprise historical transaction data from a time period.

Figure 3:
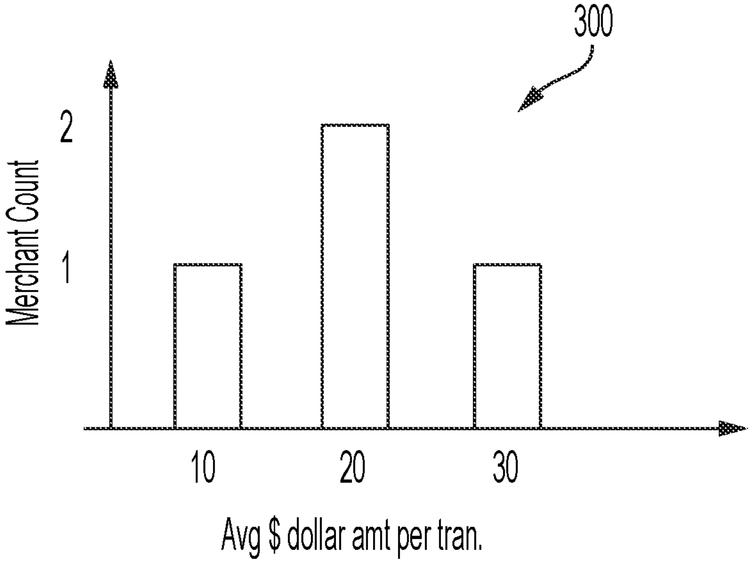
FIG. 3 shows an example of a transaction data baseline for a specific merchant category code according to some non-limiting embodiments or aspects.

With continued referenced to FIG. 1 and referring to FIG. 3, the baseline generator 116 may generate the transaction data baseline based on the transaction baseline data, and the transaction data baseline may represent the distribution associated with the transaction baseline data for the MCC. As non-limiting examples, the transaction data baseline may report the distribution for dollar amount per transaction, dollar amount per payment device used, dollar amount per cross-border transaction, fraud rate, decline rate, and/or the like, for that MCC. The transaction data variables may be variables independent of a time component. FIG. 3 shows a non-limiting example of a transaction data baseline 300 which shows a histogram in which the x-axis of the distribution shows average dollar amount per transaction and the y-axis shows the merchant count, so that it is apparent how frequently a particular average dollar amount per transaction occurs at merchants within the submitted MCC. Other transaction data baselines which help identify collusive transaction fraud may be used in addition or alternative to the transaction data baseline shown in FIG. 3.

To generate the time series baseline, in non-limiting embodiments or aspects the baseline generator 116 may extract time series baseline data associated with the submitted MCC. For example, if the first merchant system submits its MCC as MCC 0742 (veterinary services), the baseline generator 116 may extract time series baseline data associated with MCC 0742 from the transaction data database 112. The time series baseline data may comprise any time-based data associated with a merchant.

Figure 4:
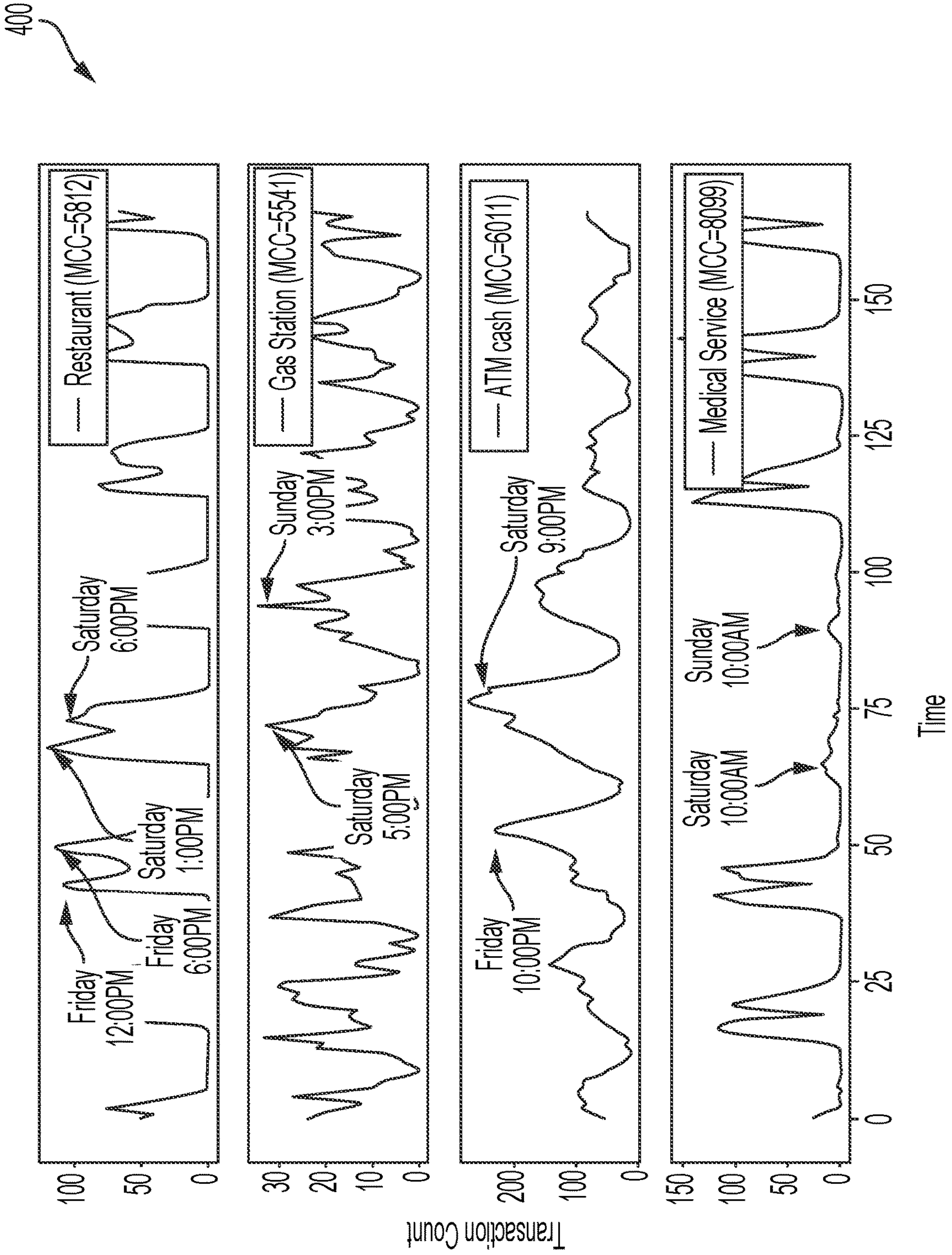
FIG. 4 shows examples of time series baselines for specific merchant category codes according to some non-limiting embodiments or aspects.

With continued referenced to FIG. 1 and referring to FIG. 4, the baseline generator 116 may generate the time series baseline based on the time series baseline data, and the time series baseline may report time-based statistics associated with the submitted MCC. As non-limiting examples, the time series baseline may report the average, median, or other like metric of the like transaction count and/or transaction spend over a predetermined time period (e.g., day, week, month, year, or the like) for the submitted MCC. FIG. 4 shows a non-limiting example of time series baselines 400 for several MCCs, including a curve of an average transaction count (y-axis) over the course of a week's time (x-axis), such that the pattern of transaction volume over time is apparent for the submitted MCC throughout the week. Other time series baselines which help improve the efficiency of an algorithm to identify collusive transaction fraud may be used as an input in addition to or in alternative to the time series baseline from FIG. 4.

The baseline generator 116 may generate at least two separate baselines associated with the submitted MCC of the first merchant system: (1) a transaction data baseline and (2) a time series baseline. The use of at least two separate baselines enhances the robustness and accuracy of the system for detecting collusive transaction fraud.

With continued reference to FIG. 1, in some non-limiting embodiments or aspects, the merchant data extractor 118 may extract transaction data associated with the first merchant system from the transaction data database 112. The transaction data extracted may correspond to the transaction baseline data used by the baseline generator 116 to generate the transaction data baseline so that a relevant comparison between the first merchant system's transaction data and the transaction data baseline for the submitted MCC may be made as described hereinafter.

With continued reference to FIG. 1, in some non-limiting embodiments or aspects, the merchant data extractor 118 may extract time series data associated with the first merchant system from the transaction data database 112. The time series data extracted may correspond to the time series baseline data used by the baseline generator 116 to generate the time series baseline so that a relevant comparison between the first merchant system's time series data and the time series baseline for the submitted MCC may be made as described hereinafter. A time series curve may be generated for the first merchant system using the same x and y axis as the time series baseline generated for the submitted MCC.

With continued reference to FIG. 1, in some non-limiting embodiments or aspects, the baseline generator 116 may communicate the transaction data baseline and the time series baseline for the submitted MCC to the fraud detector 120. The merchant data extractor 118 may communicate the transaction data and time series data associated with the first merchant system to the fraud detector 120. The fraud detector 120 may comprise at least one deep learning model. The deep learning model may employ various techniques to learn encodings, such as a deep-learning Variational Autoencoder (DL-VAE), a long short-term memory Variational Autoencoder (LSTM-VAE), or any other suitable deep learning technique to analyze the data and train the model.

Figure 5B:
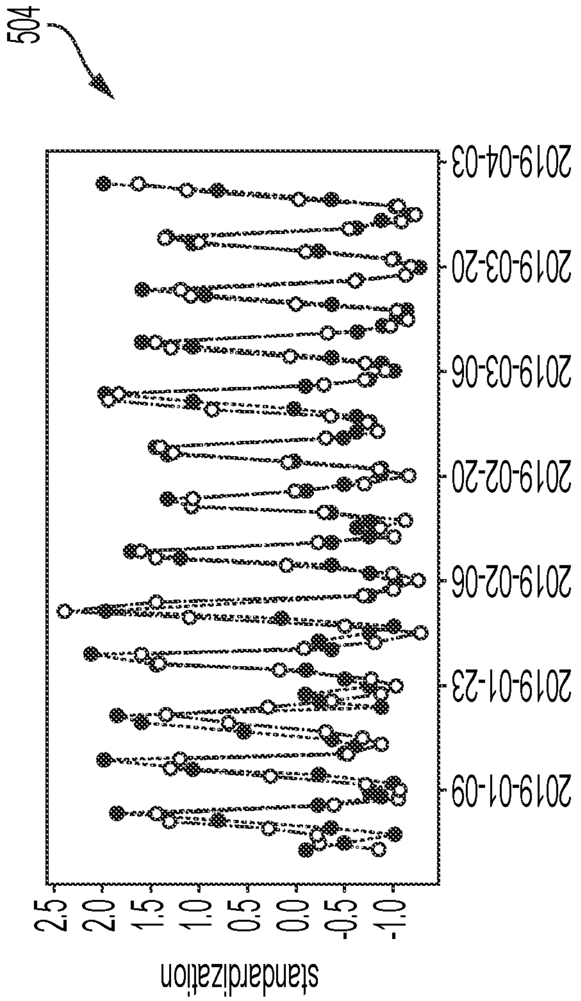
FIG. 5B shows a comparison of a time series baseline for a specific merchant category code with time series data for a specific merchant within the same merchant category code according to some non-limiting embodiments or aspects.
Figure 5A:
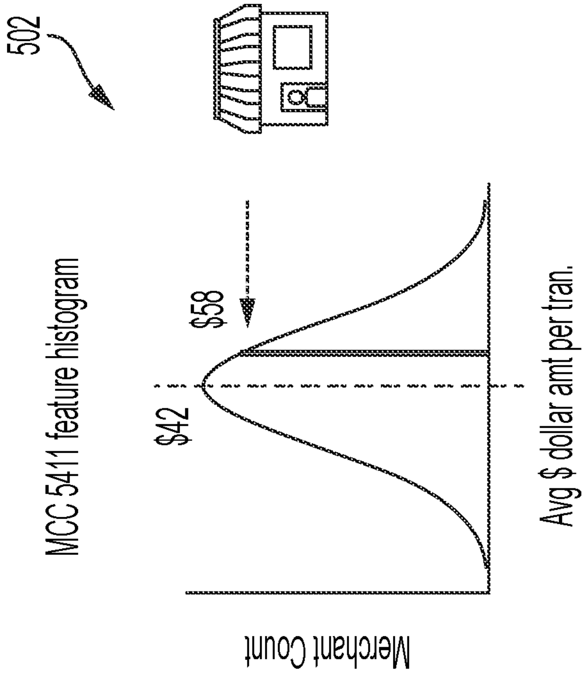
FIG. 5A shows a comparison of a transaction data baseline for a specific merchant category code with transaction data for a specific merchant within the same merchant category code according to some non-limiting embodiments or aspects.
Figure 5C:
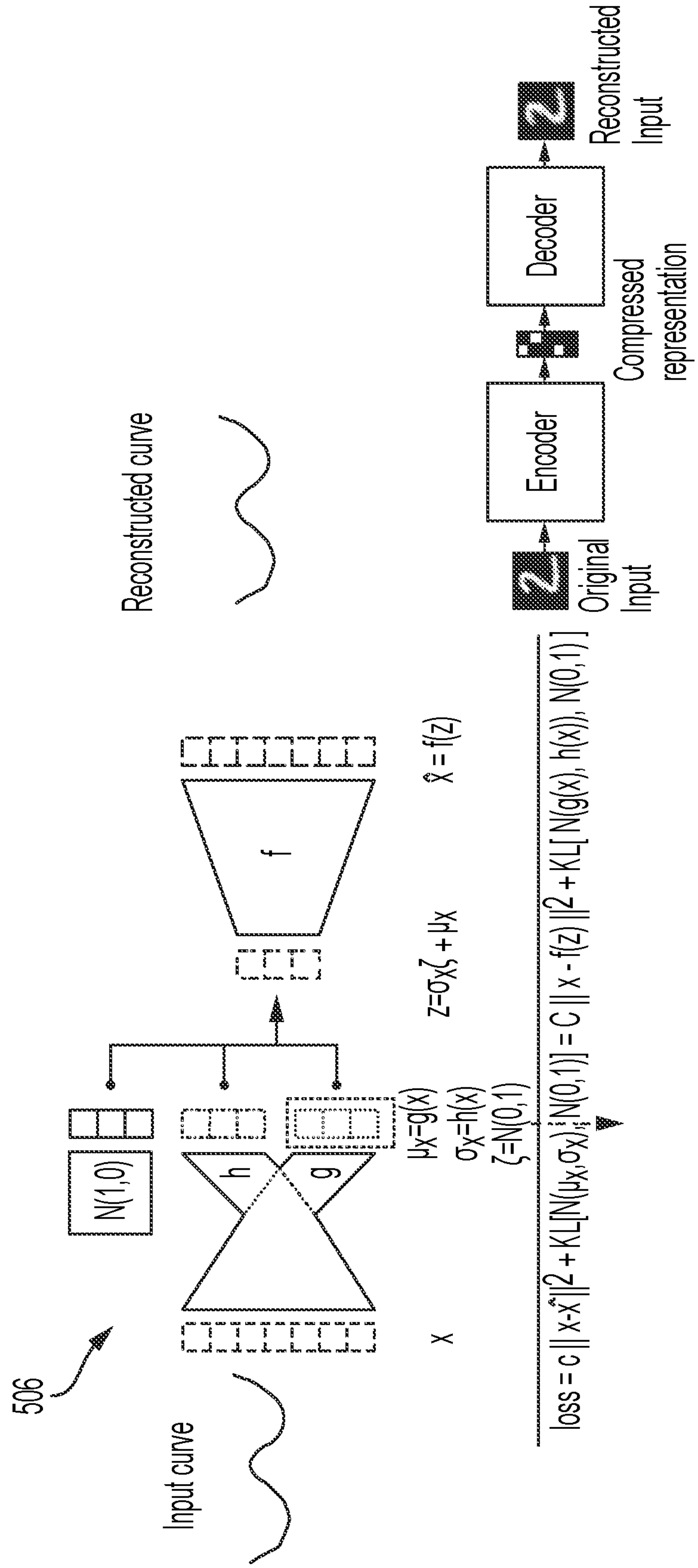
FIG. 5C shows a deep learning model used in the system for detecting collusive transaction fraud according to some non-limiting embodiments or aspects.

Referring to FIG. 5C, a deep learning model 506 is shown which may be used in connection with the system for detecting collusive transaction fraud according to some non-limiting embodiments or aspects. The deep learning model 506 may process the input data (e.g., input curve) of the first merchant system's transaction data and the transaction data baseline for the submitted MCC and compress the data using any suitable algorithm. This compressed data (e.g., a feature vector) may be the basis of the comparison conducted by the deep learning model 506 so as to generate the first score described hereinafter. Likewise, the deep learning model may process the input data (e.g., input curve) of the first merchant system's time series data and the time series baseline for the submitted MCC and compress the data using any suitable algorithm. This compressed data (e.g., a feature vector) may be the basis of the comparison conducted by the deep learning model 506 so as to generate the second score described hereinafter. While FIG. 5C shows one example of a deep learning model 506 which compresses the received data for comparison, it will be appreciated that any suitable deep learning model may be used in connection with this disclosure.

Referring again to FIG. 1, the fraud detector 120 may generate a first score associated with the first merchant system. The first score may be based on comparing the transaction data associated with the first merchant system to the transaction data baseline of the submitted MCC with the deep learning model. The first score may indicate how similar or different the transaction data associated with the first merchant system is compared to the transaction data baseline of the submitted MCC. The first score may be a numerical score (e.g., 0 to 1 or 0 to 100), a grade (e.g., A-F), a categorization (e.g., very similar, somewhat similar, not similar, and the like), and/or some combination or variation thereof. A plurality of first scores may be generated for a plurality of types of transaction data and transaction data baselines.

The fraud detector 120 may generate a second score associated with the first merchant system. The second score may be based on comparing the time series data associated with the first merchant system to the time series baseline of the submitted MCC with the deep learning model. The second score may indicate how similar or different the time series data associated with the first merchant system is compared to the time series baseline of the submitted MCC. The second score may be a numerical score (e.g., 0 to 1 or 0 to 100), a grade (e.g., A-F), a categorization (e.g., very similar, somewhat similar, not similar, and the like), and/or some combination or variation thereof. The deep learning model may compare the curve (or compression thereof) of the time series baseline with the curve (or compression thereof) generated for the first merchant system to generate the second score.

With continued reference to FIG. 1, in some non-limiting embodiments or aspects, the fraud detector 120 may generate a first merchant risk score associated with the first merchant system based on the first score and the second score. The first score and the second score may be combined in any suitable way to generate the first merchant risk score. For example, the first score and the second score may be summed, averaged, or processed according to any other mathematical combination to form the first merchant risk score. The first score and/the second score may be given the same or different weight in an algorithm including the first score and second score to generate the first merchant risk score. The first merchant risk score may indicate the overall risk that the first merchant system is involved in anomalous (e.g., fraudulent) activity, since it considers both transaction data and time series data. The first merchant risk score may be a numerical score (e.g., 0 to 1 or 0 to 100), a grade (e.g., A-F), a categorization (e.g., high risk, medium risk, low risk, and the like), and/or some combination or variation thereof.

The fraud detector 120 may determine whether the first merchant risk score satisfies (e.g., is greater than, less than, and/or equal to) a risk threshold. For example, the first merchant risk score may satisfy a risk threshold if it exceeds a predetermined or dynamically determined risk threshold. The risk threshold may represent the first merchant risk score at which there is a sufficient likelihood that the first merchant system is involved in fraudulent activity such that further analysis or investigation is warranted.

FIGS. 5A-6B show two non-limiting examples in which the transaction data of the first merchant system is compared with the transaction data baseline for the submitted MCC and the time series data of the first merchant system is compared with the time series baseline for the submitted MCC.

FIGS. 5A and 5B show a non-limiting example of an overall low risk (e.g., lower than a threshold) first merchant system based on the transaction data baseline and the time series baseline. The first merchant system has a submitted MCC of 5411 ("Grocery Stores and Supermarkets").

FIG. 5A shows a transaction data baseline for MCC 5411 which has an average dollar amount per transaction of $42. The average dollar amount per transaction for the first merchant system is $58 as shown by the vertical line in the histogram of FIG. 5A, also showing where relative to the transaction data baseline the first merchant system falls. In this example, the average dollar amount per transaction for the first merchant system is higher than average for MCC 5411, but not significantly higher (e.g., not more than a threshold amount higher) based on where on the curve the first merchant system falls. Thus, the first score will indicate relative similarity between the first merchant system and the MCC as whole, indicating a low risk merchant based only on transaction data.

FIG. 5B shows a time series baseline for MCC 5411 as a curve. Further, the time series data (its curve) for the first merchant system is displayed on the same graph as the time series for baseline for MCC 5411. In this example, the time series data for the first merchant system is similar (e.g., within a threshold) to the time series baseline MCC 5411, as both curves have significant overlap and little deviation from one another. Thus, the second score will indicate relative similarity between the first merchant system and the MCC as whole, indicating a low risk merchant based only on time series data.

Therefore, for the first merchant system in FIGS. 5A and 5B, the first and second score both indicate low risk for the merchant, such that the first merchant risk score will also likely indicate low risk and not satisfy the risk threshold.

Figure 6A:
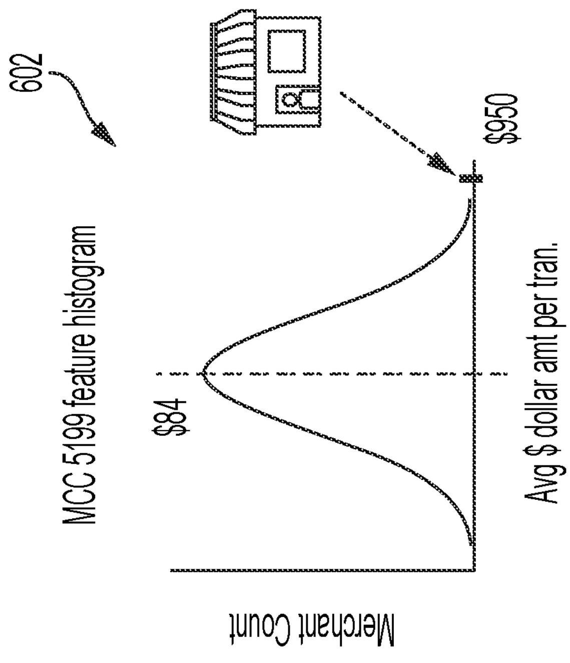
FIG. 6A shows a comparison of a transaction data baseline for a specific merchant category code with transaction data for a specific merchant within the same merchant category code according to some non-limiting embodiments or aspects.
Figure 6B:
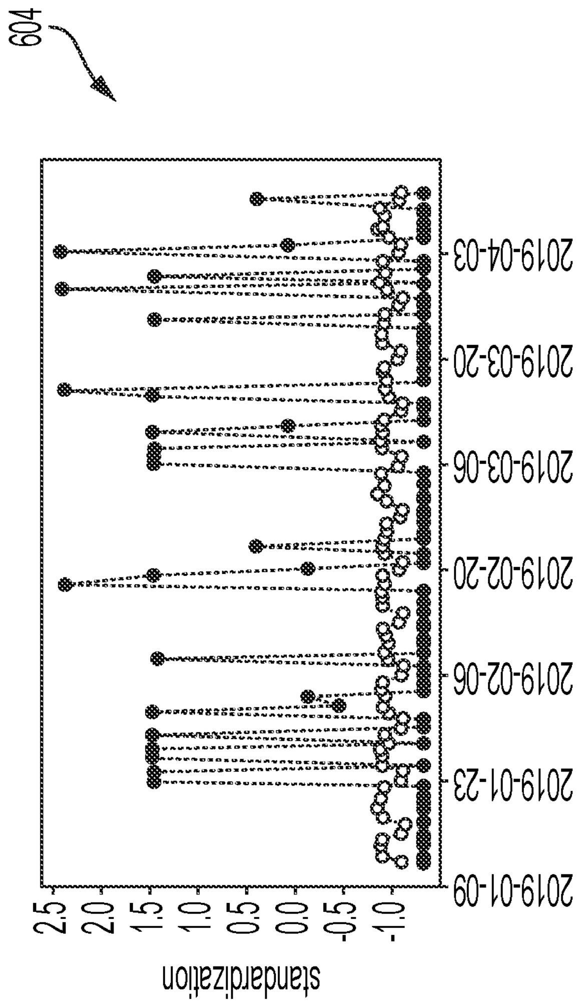
FIG. 6B shows a comparison of a time series baseline for a specific merchant category code with time series data for a specific merchant within the same merchant category code according to some non-limiting embodiments or aspects.

FIGS. 6A and 6B show a non-limiting example of an overall high risk (e.g., higher than a threshold) first merchant system based on the transaction data baseline and the time series baseline. The first merchant system has a submitted MCC of 5199 ("Nondurable Goods (Not Elsewhere Classified)").

FIG. 6A shows a transaction data baseline for MCC 5199 which has an average dollar amount per transaction of $84. The average dollar amount per transaction for the first merchant system is $950 as shown by the vertical line in the histogram of FIG. 6A, also showing where relative to the transaction data baseline the first merchant system falls. In this example, the average dollar amount per transaction for the first merchant system is significantly higher (e.g., by more than a threshold amount higher) than average for MCC 5199 and comes at the extreme high-end tail of the distribution. Thus, the first score indicates relative dissimilarity between the first merchant system and the MCC as whole, indicating a high risk merchant based only on transaction data.

FIG. 6B shows a time series baseline for MCC 5199 as a curve. Further, the time series data (the curve) for the first merchant system is displayed on the same graph as the time series for baseline for MCC 5199. In this example, the time series data for the first merchant system is dissimilar (e.g., outside a threshold) to the time series baseline MCC 5199, as both curves have little to no overlap and significant deviation from one another. Thus, the second score will indicate relative dissimilarity between the first merchant system and the MCC as whole, indicating a high risk merchant based only on time series data.

Therefore, for the first merchant system in FIGS. 6A and 6B, the first and second score both indicate high risk for the merchant, such that the first merchant risk score will also likely indicate high risk and satisfy the risk threshold, such that further analysis and/or investigation may be initiated. The fraud detection system 114 may forgo further analysis and/or investigation of low risk merchants not satisfying the risk threshold.

Referring again to FIG. 1, in response to determining that the first merchant risk score satisfies the threshold (e.g., is sufficiently high risk), the fraud detector 120 may determine a plurality of related entities related to the first merchant system. The fraud detector 120 may communicate with an entity relationship database 122 to determine the plurality of entities related to the first merchant system. The entity relationship database 122 may be the same or different from the transaction data database 112. The plurality of related entities may comprise at least one of the following: (1) an acquirer system associated with the first merchant system, (2) a second merchant system associated with the acquirer system associated with the first merchant system, and (3) a payment device which initiated a payment transaction with the first merchant system.

Referring to the exemplary entity networks 214 from FIG. 2, example entities related to a merchant system are shown. An acquirer system associated with a merchant system may refer to an acquirer system that has processed at least one electronic payment transaction with the merchant system during a time period (see merchant systems and acquirer systems connected by lines in the entity network 214 in risk group 216*b*). A second merchant system associated with the acquirer system associated with the first merchant system may refer to a merchant system which has processed at least one electronic payment transaction with an acquirer system with which the first merchant system has also processed at least one electronic payment transaction during a time period (e.g., merchant systems connected by lines to the same acquirer system in the entity network 214 in risk group 216*b*). A payment device which initiated a payment transaction with the merchant system may refer to a payment device which has initiated at least one electronic payment transaction with the merchant system during a time period (e.g., payment devices and merchant systems connected by lines in the entity network 214 in risk group 216*a*).

Referring again to FIG. 1, the fraud detector 120 may classify the first merchant system and at least one related entity of the plurality of related entities in a first group risk class based on at least one risk score associated with the at least one related entity (e.g., risk groups 216*a*, 216*b* from FIG. 2).

In some non-limiting embodiments or aspects, the fraud detector 120 may generate and/or retrieve already generated risk scores associated with each entity of the plurality of related entities. For example, for related merchant systems, merchant risks scores may be generated and/or retrieved, and those risk scores may be determined in the same manner as for the first merchant system or using any other suitable method. Risk scores may be generated and/or retrieved for each related acquirer system, and the acquirer risk scores may be determined using any suitable method. Risk scores may be generated and/or retrieved for each related payment device, and the payment device scores may be determined using any suitable method.

Referring to FIGS. 1 and 2, the fraud detector 120 may generate at least one risk group associated with the first merchant based on the risk scores of the related entities.

For example, in the entity network from FIG. 2, risk group 216*a* includes a first merchant system and three payment devices associated with high risk. For risk group 216*a*, the system may have identified the first merchant system as a high risk merchant and determined the three payment devices as being related to the first merchant system (and potentially each other). Based on the three payment devices also having a high payment device risk score (e.g., higher than a threshold), the fraud detector 120 may identify the risk group 216*a* as a group of entities potentially engaging in collusive transaction fraud. A number or percentage of high risk payment devices associated with the first merchant system (also high risk) above a threshold may indicate collusive transaction fraud between the first merchant system and at least some of the high risk payment devices.

For example, in the entity network from FIG. 2, risk group 216*b* includes a first merchant system and a second high risk merchant system and an acquirer system which is high risk (e.g., higher than a threshold). For risk group 216*b*, the system may have identified the first merchant system as a high risk merchant and determined the second merchant system and acquirer system as being related to the first merchant system (and potentially each other). Based on the second merchant system also having a high merchant risk score and the acquirer system also having a high acquirer risk score, the fraud detector 120 may identify the risk group 216*b* as a group of entities potentially engaging in collusive transaction fraud. A number or percentage of high risk merchant systems associated with the same acquirer system above a threshold may indicate collusive transaction fraud between the acquirer system and at least some of the high risk merchant systems.

The fraud detector 120 may determine a single risk group is associated with the first merchant system. The fraud detector 120 may determine several separate risk groups are associated with the first merchant system based on the determined relationship of the plurality of related entities with one another.

In some non-limiting embodiments or aspects, based on determining the risk groups, the fraud detector 120 may classify the risk groups into a risk class. The risk class may comprise a score indicating the likelihood that the risk group is conducting collusive transaction fraud. The score may be a numerical score (e.g., 0 to 1 or 0 to 100), a grade (e.g., A-F), a categorization (e.g., high risk, medium risk, low risk, and the like), and/or some combination or variation thereof. The risk class may comprise a classification of the type of collusive transaction fraud potentially being conducted by the risk group (e.g., money laundering, interchange abuse, regional and/or global illicit activity, and/or the like).

Referring again to FIG. 1, based on the determining the risk group(s) and/or classifying the risk group(s), the fraud detector 120 may communicate with the fraud action processor 124 to cause the fraud action processor 124 to execute a suitable protocol to detect or prevent future collusive transaction fraud and/or further analyze or investigate potential collusive transaction fraud and/or remedy past collusive transaction fraud.

In some non-limiting embodiments or aspects, in response to classifying the first merchant system and the at least one related entity of the plurality of related entities in the first group risk class, the fraud action processor 124 may automatically initiate a protocol to place a hold on transaction activity conducted by at least one of the first merchant system and the at least one related entity of the plurality of related entities. The hold may prevent the first merchant system and/or the at least one related entity of the plurality of related entities from engaging in further electronic payment transactions until a determined time (e.g., further investigation and/or analysis are complete). The protocol may also allow the first merchant system and/or the at least one related entity of the plurality of related entities to engage in further electronic payment transactions but with additional scrutiny (e.g., with additional requirements), and may involve delaying authorization, clearance, settlement, and/or otherwise complete processing of such transactions until a determined time (e.g., until further investigation and/or analysis are complete). Therefore, based on this protocol, the security of the electronic payment processing network 102 may be improved.

In some non-limiting embodiments or aspects, in response to classifying the first merchant system and the at least one related entity of the plurality of related entities in the first group risk class the fraud action processor 124 may automatically initiate an investigation protocol. Initiating the investigation protocol may comprise generating and communicating a notification to an investigator to cause the investigator to further analyze and/or investigate, manually and/or automatically, the potential collusive transaction fraud. Initiating the investigation protocol may additionally and/or alternatively comprise the fraud detector 120 further analyzing data (e.g., further transaction data and/or time series data) to confirm or disprove that the risk group is conducting collusive transaction fraud. Initiating the investigation protocol may additionally and/or alternatively involve processing associated transaction data with one or more additional models and/or algorithms. Therefore, based on this protocol, the security of the electronic payment processing network 102 may be improved.

With continued reference to FIG. 1, in some non-limiting embodiments or aspects, the fraud detection system 114 may determine that the MCC submitted by the first merchant system is miscoded, such as in the case of interchange abuse or regional and/or global illicit activity collusive transaction fraud. Miscoding of the MCC may be determined by manual investigation in some non-limiting embodiments or aspects. However, in some non-limiting embodiments, miscoding of the MCC may be automatically determined by the fraud action processor 124 based on the first score generated based on comparing transaction data associated with the first merchant system to the transaction data baseline and/or the second score generated based on comparing the time series data associated with the first merchant system and the time series baseline.

In response to determining that the MCC submitted by the first merchant system is miscoded, the fraud action processor 124 may determine a corrected MCC associated with the first merchant system using, for example, a model and/or algorithm that processes historical transaction data as input. The corrected MCC may also be determined by manual investigation in some non-limiting embodiments or aspects. The corrected MCC may be automatically determined by the fraud action processor 124 in several different ways. For example, the transaction data associated with the first merchant system and/or the time series data associated with the first merchant system may be compared against transaction data baselines and/or time series baselines of other MCCs, respectively. Comparing the first merchant system data with baselines of other MCCs may enable the fraud detection system 114 to automatically identify the MCC since the first merchant system data should be similar to the baseline data for the correct MCC. This may include determining first and/or second scores and/or merchant risk scores for each MCC as previously described to determine which MCCs may be most relevant.

In response to determining the corrected MCC, the fraud action processor 124 may modify the MCC submitted by the first merchant system to the corrected MCC. This modification may include storing the corrected MCC in the transaction data database 112 associated with the first merchant system, for example by modifying the submitted MCC data entry stored therein. This may enable future transactions processed by the first merchant system to be processed using the corrected MCC, thus improving the accuracy of the electronic payment processing network 102.

With continued reference to FIG. 1, illicit transaction activity may be detected by the fraud detection system 114 in the event of a miscoded MCC. In response to determining the corrected MCC, the fraud action processor 124 may automatically determine a region code associated with the first merchant system. The region code may indicate the state, country, or other region in which the first merchant system is based and/or is initiating electronic payment transactions.

Based on the region code, the fraud action processor 124 may detect illicit transaction activity being conducted by the first merchant system. The fraud action processor 124 may be in communication with a database which stores data associating region codes with MCCs corresponding to illicit activity in that region. For example, the database may associate certain regions in which gambling is forbidden with gambling MCCs which would be forbidden for use in those regions. If the corrected MCC matches an MCC forbidden in that region (based on region code), the fraud action processor may determine that the first merchant system is engaging in illicit activity. The fraud action processor 124 may place a hold on transaction activity conducted by at least one of the first merchant system and the at least one related entity of the plurality of related entities as previously described, in order to detect and/or prevent illicit activity from occurring. Therefore, based on this protocol, the security of the electronic payment processing network 102 may be improved by identifying illegal activity being conducted.

With continued reference to FIG. 1, in some non-limiting embodiments or aspects, the fraud detection system 114 (e.g., the fraud detector 120 and/or the fraud action processor 124) may determine a risk associated with at least one transaction between the first merchant system and the at least one related entity of the plurality of related entities in the first group risk class. For example, the at least one transaction may be between the first merchant system and a payment device of a user. The determined risk may be associated with the likelihood that the at least one transaction is a money laundering transaction.

The fraud detection system 114 may identify at least one payment transaction conducted between the first merchant system and the at least one related entity of the plurality of related entities in the first group risk class. The fraud detection system may determine that payment transaction is a cross-border payment transaction associated with a first region and a second region. The first region may be the region in which the user is based, and the second region may be the different region in which the merchant system is based.

The fraud detection system 114 may generate a transaction risk score associated with the payment transaction based on at least one of the following: a status of the at least one payment transaction as a cross-border payment transaction, the first region, the second region, and/or the merchant category code. The transaction risk score may be based on the first and/or second region because certain regions or combinations of regions may more often be associated with money laundering or other types of collusive transaction fraud. The transaction risk score may be based on an MCC because certain MCCs may more often be associated with money laundering or other types of collusive transaction fraud. The transaction risk score may be a numerical score (e.g., 0 to 1 or 0 to 100), a grade (e.g., A-F), a categorization (e.g., high risk, medium risk, low risk, and the like), and/or some combination or variation thereof. The transaction risk score may indicate the likelihood that the transaction is fraudulent, such as the transaction being a money laundering transaction.

With continued reference to FIG. 1, the fraud detection system 114 may determine that the transaction risk score satisfies a threshold. In response to determining that the transaction risk score satisfies a threshold, the fraud detection system may classify the payment transaction in a first transaction risk class. Classification of the payment transaction in the first transaction risk class may indicate a sufficient likelihood that the payment transaction is a money laundering or other collusive fraud transaction.

Based on the payment transaction being classified in the first transaction risk class, the fraud action processor 124 may take any of the previously described actions initiated in response to classifying the first merchant system and the at least one related entity of the plurality of related entities in the first group risk class. For example, the fraud action processor 124 may place a hold on transaction activity conducted by at least one of the first merchant system and the at least one related entity of the plurality of related entities and/or automatically initiate an investigation protocol.

Figure 7:
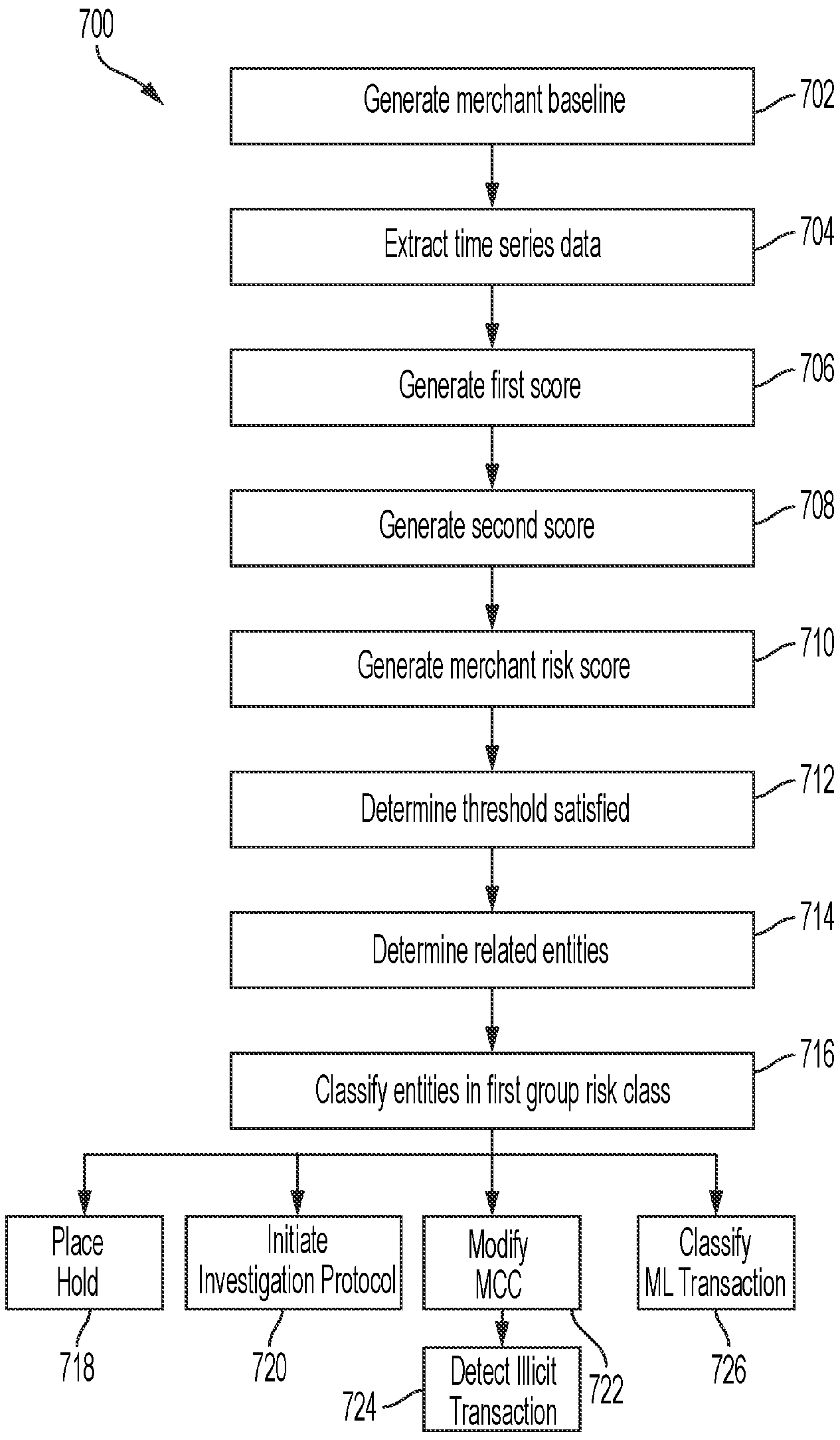
FIG. 7 shows a step diagram of a computer-implemented method for detecting collusive transaction fraud according to some non-limiting embodiments or aspects.

Referring to FIG. 7, computer-implemented method 700 is shown for detecting collusive transaction fraud according to some non-limiting embodiments or aspects. The steps shown in FIG. 7 are for example purposes only. Additional, fewer, and/or a different order of steps may be employed in non-limiting embodiments or aspects. At a step 702, the fraud detection system may generate a merchant baseline based on a merchant category code associated with a first merchant system operating in an electronic payment processing network, the merchant baseline comprising: (i) a transaction data baseline comprising transaction data baseline data associated with the merchant category code; and (ii) a time series baseline comprising time series baseline data associated with the merchant category code. At a step 704, the fraud detection system may extract time series data associated with the first merchant system. At a step 706, the fraud detection system may generate a first score based on comparing transaction data associated with the first merchant system to the transaction data baseline with a deep learning model. At a step 708, the fraud detection system may generate a second score based on comparing the time series data associated with the first merchant system to the time series baseline with the deep learning model. At a step 710, the fraud detection system may generate a first merchant risk score associated with the first merchant system based on the first score and the second score. At a step 712, the fraud detection system may determine that the first merchant risk score satisfies a threshold. At a step 714, the fraud detection system may, in response to determining that the first merchant risk score satisfies the threshold, determine a plurality of related entities related to the first merchant system. At a step 716, the fraud detection system may classify the first merchant system and at least one related entity of the plurality of related entities in a first group risk class based on at least one risk score associated with the at least one related entity.

With continued reference to FIG. 7, at a step 718, the fraud detection system may, in response to classifying the first merchant system and the at least one related entity of the plurality of related entities in the first group risk class, automatically initiate a protocol to place a hold on transaction activity conducted by at least one of the first merchant system and the at least one related entity of the plurality of related entities.

With continued reference to FIG. 7, at a step 720 the fraud detection system may, in response to classifying the first merchant system and the at least one related entity of the plurality of related entities in the first group risk class, automatically initiate an investigation protocol.

With continued reference to FIG. 7, at a step 722, the fraud detection system may modify the merchant category code associated with the first merchant system to the corrected merchant category code by: determining that the merchant category code associated with the first merchant system is miscoded; determining a corrected merchant category code associated with the first merchant system; and modifying the merchant category code associated with the first merchant system to the corrected merchant category code. At a step 724, the fraud detection system may detect illicit transaction activity of the first merchant system by: determining a region code associated with the first merchant system; and detecting illicit transaction activity of the first merchant system based on the corrected merchant category code and the region code.

With continued reference to FIG. 7, at a step 726 the fraud detection system may classify the at least one payment transaction in a first transaction risk class (e.g., as a money laundering transaction) by: identifying at least one payment transaction conducted between the first merchant system and the at least one related entity of the plurality of related entities in the first group risk class; determining that the at least one payment transaction is a cross-border payment transaction associated with a first region and a second region; generating a transaction risk score associated with the at least one payment transaction based on at least one of the following: a status of the at least one payment transaction as a cross-border payment transaction, the first region, the second region, and the merchant category code; determining that the transaction risk score satisfies a threshold; and classifying the at least one payment transaction in a first transaction risk class in response to determining that the transaction risk score satisfies the threshold.

In a non-limiting embodiment or aspect, a computer program product for detecting collusive transaction fraud includes at least one non-transitory computer readable medium including program instructions that, when executed by at least one processor, cause the at least one processor to execute one of the previously-described methods. The at least one processor may include any of the components shown in FIG. 1 (e.g., the transaction processing system 108, baseline generator 116, merchant data extractor 118, fraud detector 120, fraud action processor 124, issuer system 110, acquirer system 107, and/or merchant system 106).

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment, and one or more steps may be taken in a different order than presented in the present disclosure.

What is claimed is:

1. A computer-implemented method for detecting collusive transaction fraud, comprising:

identifying, with at least one processor of a fraud detection system, a merchant category code for a first merchant system operating in an electronic payment processing network to process electronic payment transactions, the merchant category code provided by the first merchant system;

storing, with the at least one processor of the fraud detection system, the merchant category code in association with the first merchant system in a database of the electronic payment processing network;

extracting, with at least one processor of a data extractor of the fraud detection system and from the database of the electronic payment processing network storing data associated with electronic payment transactions processed by the electronic payment processing network, transaction data baseline data for the merchant category code and time series baseline data for the merchant category code, the transaction data baseline data comprising at least one of the following: distribution of dollar amount per transaction, dollar amount per payment device used, dollar amount per cross-border transaction, fraud rate, decline rate for the merchant category code, or any combination thereof, and the time series baseline data comprising at least one of the following: an average transaction count, a median transaction count, an average transaction spend, a median transaction spend, or any combination thereof, over a time period for the merchant category code;

generating, with at least one processor of a baseline generator of the fraud detection system, a merchant baseline for the merchant category code, the merchant baseline comprising: (i) a transaction data baseline generated from the transaction data baseline data for the merchant category code; and (ii) a time series baseline generated from the time series baseline data for the merchant category code;

extracting, with the at least one processor of the data extractor of the fraud detection system and from the database of the electronic payment processing network, time series data for the first merchant system, the time series data for the first merchant system comprising at least one of the following: an average transaction count, a median transaction count, an average transaction spend, a median transaction spend, or any combination thereof over a time period for the first merchant system;

extracting, with the at least one processor of the data extractor of the fraud detection system and from the database of the electronic payment processing network, transaction data for the first merchant system, the transaction data for the first merchant system comprising at least one of the following: a distribution of dollar amount per transaction, dollar amount per payment device used, dollar amount per cross-border transaction, fraud rate, decline rate for the first merchant system, or any combination thereof;

inputting, with at least one processor of the fraud detection system, the transaction data for the first merchant system and the transaction data baseline to a deep learning model of the fraud detection system;

generating, with the deep learning model, a first score based on comparing the transaction data for the first merchant system to the transaction data baseline;

inputting, with at least one processor of the fraud detection system, the time series data for the first merchant system and the time series baseline to the deep learning model of the fraud detection system;

generating, with the deep learning model, a second score based on comparing the time series data for the first merchant system to the time series baseline, wherein generating the first score and/or the second score comprises the deep learning model:

compressing the transaction data and the transaction data baseline and/or compressing the time series data and the time series baseline by generating at least one feature vector for each;

comparing the at least one feature vector for the transaction data and the at least one feature vector for the transaction data baseline and/or comparing the at least one feature vector for the time series data and the at least one feature vector for the time series baseline; and generating the first score and/or the second score based on the comparison;

generating, with the at least one processor of the fraud detection system, a first merchant risk score associated with the first merchant system based on the first score and the second score;

based on the first merchant risk score, determining, with the at least one processor of the fraud detection system, that the merchant category code for the first merchant is miscoded;

determining, with the at least one processor of the fraud detection system, a plurality of related entities related to the first merchant system based on the data associated with electronic payment transactions processed by the electronic payment processing network stored in the database of the electronic payment processing network, the plurality of related entities comprising at least one of the following: an acquirer system associated with the first merchant system, a second merchant system associated with the acquirer system associated with the first merchant system, a payment device which initiated a payment transaction with the first merchant system, or any combination thereof;

classifying, with the at least one processor of the fraud detection system, the first merchant system and at least one related entity of the plurality of related entities in a first group risk class based on at least one risk score generated by the fraud detection system for the at least one related entity, the first group risk class based on a determination that the first merchant system and the at least one related entity are engaged in collusive transaction fraud;

determining, with the at least one processor of the fraud detection system, a corrected merchant category code for the first merchant system by comparing the transaction data for the first merchant system to transaction data baselines of a plurality of merchant category codes and/or comparing the time series data for the first merchant system to time series baselines of a plurality of merchant category codes;

automatically modifying, with the at least one processor of the fraud detection system, the merchant category code for the first merchant system by modifying the merchant category code stored in the database of the electronic payment processing network to the corrected merchant category code;

after modifying the merchant category code for the first merchant system, receiving, with a transaction processing system in the electronic payment processing network, a payment transaction request associated with the first merchant system and the at least one related entity; and processing, with the transaction processing system, the payment transaction request using the corrected merchant category code based on the corrected category code stored in the database of the electronic payment processing network.

2. The computer-implemented method of claim 1, further comprising:

in response to classifying the first merchant system and the at least one related entity of the plurality of related entities in the first group risk class, automatically initiating, with the at least one processor, an investigation protocol.

3. The computer-implemented method of claim 1, further comprising:

determining, with the at least one processor, a region code associated with the first merchant system; and detecting illicit transaction activity of the first merchant system based on the corrected merchant category code and the region code.

4. The computer-implemented method of claim 1, further comprising:

identifying, with the at least one processor, at least one payment transaction conducted between the first merchant system and the at least one related entity of the plurality of related entities in the first group risk class;

determining, with the at least one processor, that the at least one payment transaction is a cross-border payment transaction associated with a first region and a second region;

generating, with at least one processor, a transaction risk score associated with the at least one payment transaction based on at least one of the following: a status of the at least one payment transaction as a cross-border payment transaction, the first region, the second region, and the merchant category code;

determining, with the at least one processor, that the transaction risk score satisfies a threshold; and classifying, with the at least one processor, the at least one payment transaction in a first transaction risk class in response to determining that the transaction risk score satisfies the threshold.

5. A system for detecting collusive transaction fraud, comprising at least one processor programmed or configured to:

identify a merchant category code for a first merchant system operating in an electronic payment processing network to process electronic payment transactions, the merchant category code provided by the first merchant system;

store the merchant category code in association with the first merchant system in a database of the electronic payment processing network;

extract, with a data extractor of a fraud detection system and from the database of the electronic payment processing network storing data associated with electronic payment transactions processed by the electronic payment processing network, transaction data baseline data for the merchant category code and time series baseline data for the merchant category code, the transaction data baseline data comprising at least one of the following: distribution of dollar amount per transaction, dollar amount per payment device used, dollar amount per cross-border transaction, fraud rate, decline rate for the merchant category code, or any combination thereof, and the time series baseline data comprising at least one of the following: an average transaction count, a median transaction count, an average transaction spend, a median transaction spend, or any combination thereof, over a time period for the merchant category code;

generate, with a baseline generator of the fraud detection system, a merchant baseline for the merchant category code, the merchant baseline comprising: (i) a transaction data baseline generated from the transaction data baseline data for the merchant category code; and (ii) a time series baseline generated from the time series baseline data for the merchant category code;

extract, with the data extractor of the fraud detection system and from the database of the electronic payment processing network, time series data for the first merchant system, the time series data for the first merchant system comprising at least one of the following: an average transaction count, a median transaction count, an average transaction spend, a median transaction spend, or any combination thereof over a time period for the first merchant system;

extract, with the data extractor of the fraud detection system and from the database of the electronic payment processing network, transaction data for the first merchant system, the transaction data for the first merchant system comprising at least one of the following: a distribution of dollar amount per transaction, dollar amount per payment device used, dollar amount per cross-border transaction, fraud rate, decline rate for the first merchant system, or any combination thereof;

input the transaction data for the first merchant system and the transaction data baseline to a deep learning model of the fraud detection system;

generate, with the deep learning model, a first score based on comparing the transaction data for the first merchant system to the transaction data baseline;

input the time series data for the first merchant system and the time series baseline to the deep learning model of the fraud detection system;

generate, with the deep learning model, a second score based on comparing the time series data for the first merchant system to the time series baseline, wherein generating the first score and/or the second score comprises the deep learning model:

compressing the transaction data and the transaction data baseline and/or compressing the time series data and the time series baseline by generating at least one feature vector for each;

comparing the at least one feature vector for the transaction data and the at least one feature vector for the transaction data baseline and/or comparing the at least one feature vector for the time series data and the at least one feature vector for the time series baseline; and generating the first score and/or the second score based on the comparison;

generate a first merchant risk score associated with the first merchant system based on the first score and the second score;

based on the first merchant risk score, determine that the merchant category code for the first merchant is miscoded;

determine a plurality of related entities related to the first merchant system based on the data associated with electronic payment transactions processed by the electronic payment processing network stored in the database of the electronic payment processing network, the plurality of related entities comprise at least one of the following: an acquirer system associated with the first merchant system, a second merchant system associated with the acquirer system associated with the first merchant system, a payment device which initiated a payment transaction with the first merchant system, or any combination thereof;

classify the first merchant system and at least one related entity of the plurality of related entities in a first group risk class based on at least one risk score generated by the fraud detection system for the at least one related entity, the first group risk class based on a determination that the first merchant system and the at least one related entity are engaged in collusive transaction fraud;

determine a corrected merchant category code for the first merchant system by comparing the transaction data for the first merchant system to transaction data baselines of a plurality of merchant category codes and/or comparing the time series data for the first merchant system to time series baselines of a plurality of merchant category codes;

automatically modify the merchant category code for the first merchant system by modifying the merchant category code stored in the database of the electronic payment processing network to the corrected merchant category code;

after modifying the merchant category code for the first merchant system, receive, with a transaction processing system in the electronic payment processing network, a payment transaction request associated with the first merchant system and the at least one related entity; and process, with the transaction processing system, the payment transaction request using the corrected merchant category code based on the corrected category code stored in the database of the electronic payment processing network.

6. The system of claim 5, wherein the at least one processor is further programmed or configured to:

in response to classifying the first merchant system and the at least one related entity of the plurality of related entities in the first group risk class, automatically initiate an investigation protocol.

7. The system of claim 5, wherein the at least one processor is further programmed or configured to:

determine a region code associated with the first merchant system; and detect illicit transaction activity of the first merchant system based on the corrected merchant category code and the region code.

8. The system of claim 5, wherein the at least one processor is further programmed or configured to:

identify at least one payment transaction conducted between the first merchant system and the at least one related entity of the plurality of related entities in the first group risk class;

determine that the at least one payment transaction is a cross-border payment transaction associated with a first region and a second region;

generate a transaction risk score associated with the at least one payment transaction based on at least one of the following: a status of the at least one payment transaction as a cross-border payment transaction, the first region, the second region, and the merchant category code;

determine that the transaction risk score satisfies a threshold; and classify the at least one payment transaction in a first transaction risk class in response to determining that the transaction risk score satisfies the threshold.

9. A computer program product for detecting collusive transaction fraud, the computer program product comprising at least one non-transitory computer-readable medium including one or more instructions that, when executed by at least one processor, cause the at least one processor to:

identify a merchant category code for a first merchant system operating in an electronic payment processing network to process electronic payment transactions, the merchant category code provided by the first merchant system;

store the merchant category code in association with the first merchant system in a database of the electronic payment processing network;

extract, with a data extractor of a fraud detection system and from the database of the electronic payment processing network storing data associated with electronic payment transactions processed by the electronic payment processing network, transaction data baseline data for the merchant category code and time series baseline data for the merchant category code, the transaction data baseline data comprising at least one of the following: distribution of dollar amount per transaction, dollar amount per payment device used, dollar amount per cross-border transaction, fraud rate, decline rate for the merchant category code, or any combination thereof, and the time series baseline data comprising at least one of the following: an average transaction count, a median transaction count, an average transaction spend, a median transaction spend, or any combination thereof, over a time period for the merchant category code;

generate, with a baseline generator of the fraud detection system, a merchant baseline for the merchant category code, the merchant baseline comprising: (i) a transaction data baseline generated from the transaction data baseline data for the merchant category code; and (ii) a time series baseline generated from the time series baseline data for the merchant category code;

extract, with the data extractor of the fraud detection system and from the database of the electronic payment processing network, time series data for the first merchant system, the time series data associated with the first merchant system comprising at least one of the following: an average transaction count, a median transaction count, an average transaction spend, a median transaction spend, or any combination thereof over a time period for the first merchant system;

extract, with the data extractor of the fraud detection system and from the database of the electronic payment processing network, transaction data for the first merchant system, the transaction data for the first merchant system comprising at least one of the following: a distribution of dollar amount per transaction, dollar amount per payment device used, dollar amount per cross-border transaction, fraud rate, decline rate for the first merchant system, or any combination thereof;

input the transaction data for the first merchant system and the transaction data baseline to a deep learning model of the fraud detection system;

generate, with the deep learning model, a first score based on comparing the transaction data for the first merchant system to the transaction data baseline;

input the time series data for the first merchant system and the time series baseline to the deep learning model of the fraud detection system;

generate, with the deep learning model, a second score based on comparing the time series data for the first merchant system to the time series baseline, wherein generating the first score and/or the second score comprises the deep learning model:

compressing the transaction data and the transaction data baseline and/or compressing the time series data and the time series baseline by generating at least one feature vector for each;

comparing the at least one feature vector for the transaction data and the at least one feature vector for the transaction data baseline and/or comparing the at least one feature vector for the time series data and the at least one feature vector for the time series baseline; and generating the first score and/or the second score based on the comparison;

generate a first merchant risk score associated with the first merchant system based on the first score and the second score;

based on the first merchant risk score, determine that the merchant category code for the first merchant is miscoded;

determine a plurality of related entities related to the first merchant system based on the data associated with electronic payment transactions processed by the electronic payment processing network stored in the database of the electronic payment processing network, the plurality of related entities comprise at least one of the following: an acquirer system associated with the first merchant system, a second merchant system associated with the acquirer system associated with the first merchant system, a payment device which initiated a payment transaction with the first merchant system, or any combination thereof;

classify the first merchant system and at least one related entity of the plurality of related entities in a first group risk class based on at least one risk score generated by the fraud detection system for the at least one related entity, the first group risk class based on a determination that the first merchant system and the at least one related entity are engaged in collusive transaction fraud;

determine a corrected merchant category code for the first merchant system by comparing the transaction data for the first merchant system to transaction data baselines of a plurality of merchant category codes and/or comparing the time series data for the first merchant system to time series baselines of a plurality of merchant category codes;

automatically modify the merchant category code for the first merchant system by modifying the merchant category code stored in the database of the electronic payment processing network to the corrected merchant category code;

after modifying the merchant category code for the first merchant system, receive, with a transaction processing system in the electronic payment processing network, a payment transaction request associated with the first merchant system and the at least one related entity; and process, with the transaction processing system, the payment transaction request using the corrected merchant category code based on the corrected category code stored in the database of the electronic payment processing network.

10. The computer program product of claim 9, wherein the one or more instructions further cause the at least one processor to:

in response to classifying the first merchant system and the at least one related entity of the plurality of related entities in the first group risk class, automatically initiate an investigation protocol.

11. The computer program product of claim 9, wherein the one or more instructions further cause the at least one processor to:

determine a region code associated with the first merchant system; and detect illicit transaction activity of the first merchant system based on the corrected merchant category code and the region code.

12. The computer program product of claim 9, wherein the one or more instructions further cause the at least one processor to:

identify at least one payment transaction conducted between the first merchant system and the at least one related entity of the plurality of related entities in the first group risk class;

determine that the at least one payment transaction is a cross-border payment transaction associated with a first region and a second region;

generate a transaction risk score associated with the at least one payment transaction based on at least one of the following: a status of the at least one payment transaction as a cross-border payment transaction, the first region, the second region, and the merchant category code;

determine that the transaction risk score satisfies a threshold; and classify the at least one payment transaction in a first transaction risk class in response to determining that the transaction risk score satisfies the threshold.

13. The computer-implemented method of claim 1, wherein the determining the plurality of related entities related to the first merchant system comprises retrieving from an entity relationship database the plurality of related entities related to the first merchant system based on data stored in the entity relationship database, wherein the computer-implemented method further comprises:

for each entity of the plurality of related entities related to the first merchant system, generating, with the at least one processor, an entity risk score, the entity risk score for the at least one related entity comprises the at least one risk score associated with the at least one related entity;

determining, with the at least one processor, that the at least one risk score associated with the at least one related entity satisfies a second threshold;

based on the first merchant risk score satisfying the threshold and the at least one risk score associated with the at least one related entity satisfying the second threshold, determining, with the at least one processor, a collusive group; and in response to determining the collusive group, classifying, with the at least one processor, the first merchant system and at least one related entity of the plurality of related entities in the first group risk class.

14. The computer-implemented method of claim 1, further comprising:

modifying, with the transaction processing system, the payment transaction request with the corrected merchant category code by modifying the merchant category code in the payment transaction request with the corrected merchant category code based on the corrected merchant category code stored in the database of the electronic payment processing network; and processing, with the transaction processing system, the payment transaction request using the corrected merchant category code.

* * * * *